United States Patent
Yasuda et al.

(10) Patent No.: US 12,545,235 B2
(45) Date of Patent: Feb. 10, 2026

(54) SYSTEMS AND METHODS FOR ADJUSTING WHEEL ROTATIONAL SPEED TO REDUCE PASSENGER MOTION SICKNESS

(71) Applicant: Toyota Research Institute, Inc., Los Altos, CA (US)

(72) Inventors: Hiroshi Yasuda, San Carlos, CA (US); Andrea Michelle Rios Lazcano, Brussels (BE)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 76 days.

(21) Appl. No.: 18/678,052

(22) Filed: May 30, 2024

(65) Prior Publication Data
US 2025/0368185 A1 Dec. 4, 2025

(51) Int. Cl.
*B60W 30/02* (2012.01)

(52) U.S. Cl.
CPC ..... *B60W 30/025* (2013.01); *B60W 2520/105* (2013.01); *B60W 2720/16* (2013.01)

(58) Field of Classification Search
CPC ......... B60W 30/025; B60W 2520/105; B60W 2720/16
See application file for complete search history.

(56) References Cited

U.S. PATENT DOCUMENTS

| | | |
|---|---|---|
| 7,398,154 B2 | 7/2008 | Phuyal et al. |
| 7,437,219 B2 | 10/2008 | Bos |
| 7,690,452 B2 | 4/2010 | Kamen et al. |
| 8,195,351 B2 | 6/2012 | Ichinose et al. |
| 8,332,119 B2 | 12/2012 | Bach et al. |
| 9,868,438 B2 | 1/2018 | Jung et al. |
| 9,884,626 B2 | 2/2018 | Kelly et al. |
| 10,107,635 B2 | 10/2018 | Larner et al. |
| 10,248,129 B2 | 4/2019 | Reed |
| 10,259,451 B2 | 4/2019 | Wan et al. |

(Continued)

FOREIGN PATENT DOCUMENTS

CN 116588110 A 8/2023

OTHER PUBLICATIONS

Youtube, "Crab Walk Hyundai Ioniq 5—Hyundai's e-Corner Embarrasses GMC Hummer's!" Retrieved from the Internet: <https://youtu.be/UZPDi1C3nAE?si=zRwjTpEPWo5IH27p>, Retrieved Apr. 26, 2024.

(Continued)

*Primary Examiner* — Sizo B Vilakazi
(74) *Attorney, Agent, or Firm* — Christopher G. Darrow; Darrow Mustafa PC

(57) ABSTRACT

Systems, methods, and other embodiments described herein relate to reducing passenger motion sickness resulting from a pitch change of a vehicle as a navigated road changes slope. In one embodiment, a method includes detecting a slope in a road in front of a vehicle and detecting a motion sickness state of a passenger of the vehicle. The method includes, adjusting, based on the motion sickness state of the passenger, a pitch angle of the vehicle to offset a slope angle of the road. The pitch angle is adjusted by independently adjusting a rotational speed of different wheels of the vehicle to generate a difference between a front wheel rotational speed of the vehicle and a rear wheel rotational speed of the vehicle.

20 Claims, 7 Drawing Sheets

(56) References Cited

U.S. PATENT DOCUMENTS

| | | |
|---|---|---|
| 10,293,820 B2 | 5/2019 | Fairgrieve et al. |
| 10,407,045 B2 | 9/2019 | Kneitz et al. |
| 10,543,758 B2 | 1/2020 | Hardee et al. |
| 10,821,969 B2 | 11/2020 | Pan et al. |
| 10,942,037 B1 | 3/2021 | Larner et al. |
| 11,117,589 B2 | 9/2021 | Chen et al. |
| 11,173,885 B2 | 11/2021 | Hawley et al. |
| 11,260,901 B2 | 3/2022 | Yamazaki et al. |
| 11,447,112 B2 | 9/2022 | Hiraga et al. |
| 11,667,222 B1 | 6/2023 | Larner et al. |
| 11,691,648 B2 | 7/2023 | Theverapperuma et al. |
| 2018/0052000 A1* | 2/2018 | Larner ................. G05D 1/0212 |
| 2019/0022347 A1* | 1/2019 | Wan ........................ A61B 5/18 |
| 2021/0086826 A1 | 3/2021 | Guy |
| 2021/0402984 A1 | 12/2021 | Funke et al. |
| 2022/0001894 A1* | 1/2022 | Yeom ................... B60W 40/08 |
| 2022/0041061 A1 | 2/2022 | Kang |
| 2022/0314816 A1 | 10/2022 | Wang et al. |
| 2023/0037740 A1 | 2/2023 | Ha |
| 2025/0108788 A1* | 4/2025 | Maeda ................. B60W 40/08 |
| 2025/0108834 A1* | 4/2025 | Singh ................. B60W 30/182 |

OTHER PUBLICATIONS

Youtube, "How does In-Wheel Motor Technology Work? | Four Motor Drive & Torque Vectoring," Retrieved from the Internet: <https://youtu.be/yS3w2ljkzxU?si=izBd8slx816CMF3I>, Retrieved Apr. 26, 2024.

Kamal et al. "Ecological Vehicle Control on Roads With Up-Down Slopes." IEEE Transactions on Intelligent Transportation Systems Dec. 3, 2011.

\* cited by examiner

SYSTEMS AND METHODS FOR ADJUSTING WHEEL ROTATIONAL SPEED TO REDUCE PASSENGER MOTION SICKNESS

TECHNICAL FIELD

The subject matter described herein relates, in general, to reducing vehicle passenger motion sickness and, more particularly, to adjusting a vehicle pitch angle to offset a road slope to reduce the likelihood of motion sickness, which motion sickness may otherwise arise as a vehicle pitch changes as the vehicle navigates sloped roads.

BACKGROUND

Various types of vehicle-navigated roads form a complex and vast network across the globe. The types of roads that make up the network vary from multi-lane high-speed freeways with thousands of vehicles passing by a particular location to rural and remote dirt roads rarely traveled on. These roads cross various terrain, including flat landscapes to mountainous regions, and generally follow the terrain contours. For example, a road may slope down or up when entering and exiting a valley. As such, as vehicles traverse a network of roads, the pitch of the vehicle does not remain constant but changes based on the contours of the terrain and/or road features such as overpasses, underpasses, freeway on-ramps, exit ramps, and other more minor road features such as bumps or dips in the road.

SUMMARY

In one embodiment, example systems and methods relate to a manner of improving the in-vehicle passenger experience in light of potential motion-sickness-inducing conditions such as road slope changes.

In one embodiment, a wheel control system for adjusting vehicle wheel rotational speeds to adjust a vehicle pitch angle to offset a road slope is disclosed. The wheel control system includes one or more processors and a memory communicably coupled to the one or more processors. The memory stores instructions that, when executed by the one or more processors, cause the one or more processors to detect a slope in a road in front of a vehicle and detect a motion sickness state of a passenger of the vehicle. The memory also stores instructions that, when executed by the one or more processors, cause the one or more processors to adjust, based on the motion sickness state of the passenger, a pitch angle of the vehicle to offset a slope angle of the road by independently adjusting a rotational speed of different wheels of the vehicle to generate a difference between a front wheel rotational speed of the vehicle and a rear wheel rotational speed of the vehicle.

In one embodiment, a non-transitory computer-readable medium for adjusting vehicle wheel speeds to adjust a vehicle pitch to offset a road slope and including instructions that, when executed by one or more processors, cause the one or more processors to perform one or more functions is disclosed. The instructions include instructions to detect a slope in a road in front of a vehicle and detect a motion sickness state of a passenger of the vehicle. The instructions also include instructions to adjust, based on the motion sickness state of the passenger, a pitch angle of the vehicle to offset a slope angle of the road by independently adjusting a rotational speed of different wheels of the vehicle to generate a difference between a front wheel rotational speed of the vehicle and a rear wheel rotational speed of the vehicle.

In one embodiment, a method for adjusting vehicle wheel speeds to adjust a vehicle pitch angle to offset a road slope is disclosed. In one embodiment, the method includes detecting a slope in a road in front of a vehicle and detecting a motion sickness state of a passenger of the vehicle. The method also includes adjusting, based on the motion sickness state of the passenger, a pitch angle of the vehicle to offset a slope angle of the road by independently adjusting a rotational speed of different wheels of the vehicle to generate a difference between a front wheel rotational speed of the vehicle and a rear wheel rotational speed of the vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
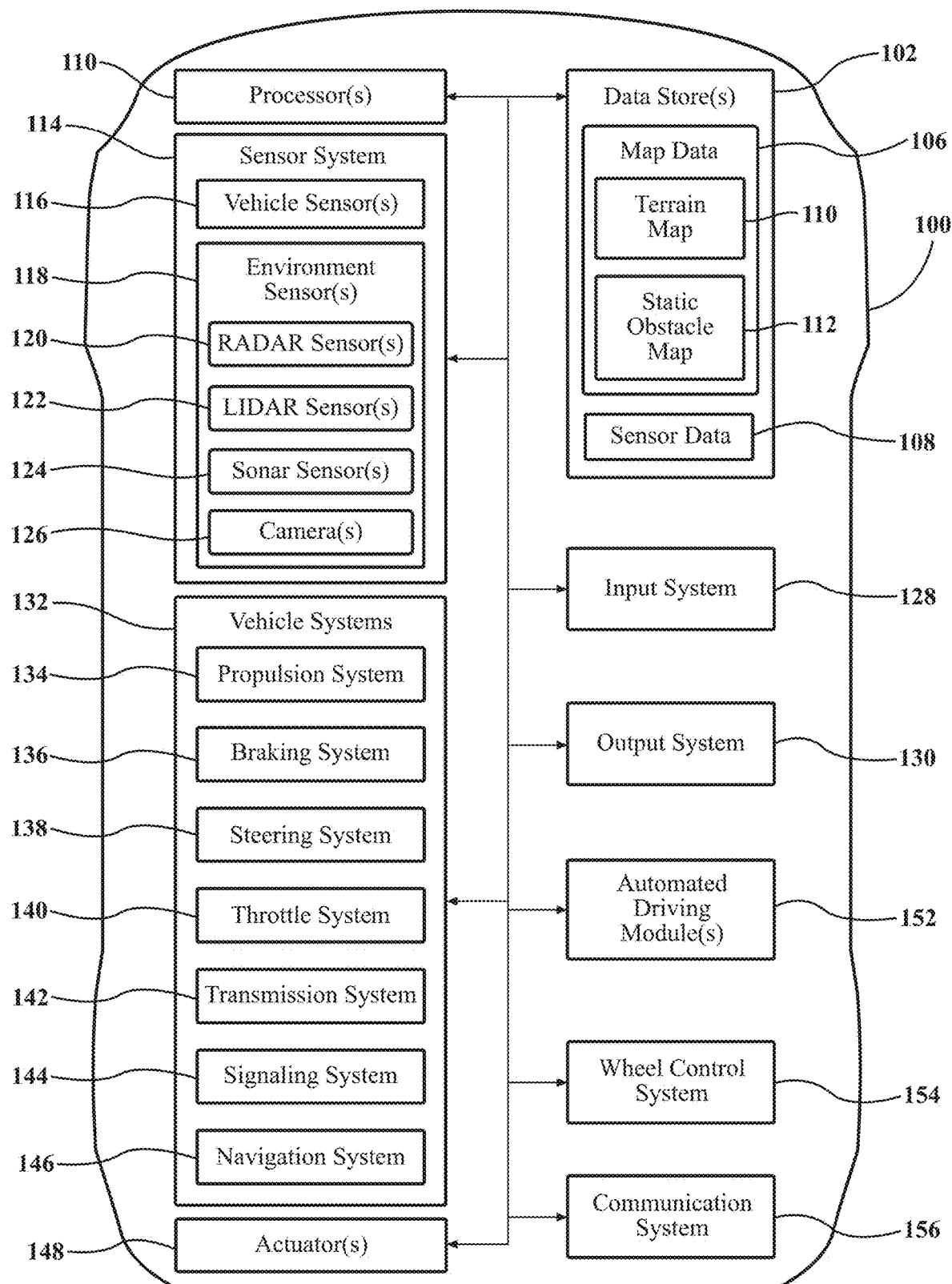
FIG. 1 illustrates one embodiment of a vehicle within which systems and methods disclosed herein may be implemented.

Systems, methods, and other embodiments associated with improving the passenger experience on a road that varies in slope are disclosed herein. As previously described, a vehicle is likely to be exposed to varying slopes of the road as the vehicle traverses across a network of roads, from steep descents when exiting a mountainous region to steep ascents when entering the mountainous region and all types of slopes in between. A vehicle will likely travel up and down smaller hills even in generally flat landscapes such as flat countryside. That is to say, it is expected that a vehicle will see more than just flat roads throughout its life.

While vehicular travel provides numerous social, recreational, and economic benefits, the experience of driving a vehicle across roads carries inherent discomforts. For example, some passengers are physically sensitive to changes in the slope of the road, where changes to the road slope can cause passengers to experience motion sickness. That is, the vehicle pitch angle changes along with the road slope angle. This pitching motion (whether resulting from a single considerable change in the road slope or multiple minor changes to the road slope over a relatively short period) may cause vehicle occupants to experience motion sickness. Motion sickness may have a variety of physical manifestations, including nausea, vomiting, cold sweat, pallor, headaches, a loss of appetite, increased salivation, and fidgetiness, among other physical manifestations. In addition to being uncomfortable, motion sickness may pose a risk to passengers and other road users. For example, motion sickness may impede a driver's ability to operate the vehicle safely.

Accordingly, the present specification describes a system that reduces the likelihood of occupant motion sickness resulting from vehicle pitch changes. Specifically, the system is implemented in an over-actuated vehicle where the rotational speed of the vehicle's wheels may be independently controlled. An over-actuated vehicle is one in which the wheels are independently controlled in at least one way. For example, each wheel may be independently steerable, facilitating the execution of advanced maneuvers such as zero-radius turns, diagonal driving, crab (or sideways) driving, and pivot turns. As another example, the rotational speed of each wheel may be independently controlled. As such, an over-actuated vehicle may include a motor per wheel that applies torque specifically to the paired wheel. Accordingly, as the over-actuated vehicle can independently control the rotational speed of different wheels, the present system counteracts the pitch rotation caused by driving up or down a sloped road so that the occupants do not feel the effects of slope changes as heavily.

More specifically, the wheel control system identifies upcoming slopes in the road (e.g., hills, bumps, ascents, descents, etc.) in the path of the vehicle using a variety of data, including map data, perception sensor data, vehicle dynamic data, crowd-sourced sensor data, etc. The system also determines the actual or expected motion sickness state of an occupant of the vehicle. Specifically, based on real-time occupant monitoring data, vehicle dynamic data, and/or occupant profile information, the system determines whether an occupant is currently experiencing or susceptible to motion sickness. Based on the motion sickness state of the passenger and the detected slope change of the road, the wheel control system alters the rotational speed of a pair of wheels (e.g., front or rear) to offset the vehicle pitch rotation brought about by the change in road slope. For example, when driving on a positive slope (i.e., an uphill slope), the front wheels may be slowed relative to the rear wheels while maintaining a desired overall vehicle speed. This rotational speed difference between the front and rear wheels may cause the vehicle to pitch forward, thus offsetting at least a portion of the positive road slope-based pitch rotation of the vehicle. By comparison, when driving on a negative slope (i.e., a descent), the rear wheels may be slowed relative to the front wheels. The rear wheels having a lesser rotational speed than the front wheels may cause the vehicle to pitch backward, thus offsetting at least a portion of the negative road slope-based pitch rotation of the vehicle. In this way, the pitch rotation felt by the passengers is eliminated or reduced, and passengers are relieved from at least a portion of the rotation-inducing motion sickness they may otherwise encounter. When the vehicle returns to a generally flat road (i.e., within a threshold slope range), the difference in rotational speeds of the wheels may be eliminated or reduced.

In this way, the disclosed systems, methods, and other embodiments improve passenger experience within a vehicle by reducing the slope change-induced likelihood of motion sickness. This may also increase road safety as drivers who would otherwise be subject to the potentially dangerous manifestations of motion sickness maintain a mental and physical state conducive to safe vehicle operation. Moreover, the execution of motion-sickness-preventing measures is customized to particular occupants, with measures implemented less significantly for those less susceptible to motion sickness.

Referring to FIG. 1, an example of a vehicle 100 is illustrated. As used herein, a "vehicle" is any form of transport that may be motorized or otherwise powered. In one or more implementations, the vehicle 100 is an automobile. While arrangements will be described herein with respect to automobiles, it will be understood that embodiments are not limited to automobiles. In some implementations, the vehicle 100 may be a robotic device or a form of transport that, for example, includes sensors to perceive aspects of the surrounding environment and passengers of the form of transport, and thus benefits from the functionality discussed herein associated with reducing the likelihood of motion sickness in passengers by altering the rotational speed of different wheels to generate a pitch that offsets the slope of a traveled surface.

The vehicle 100 also includes various elements. It will be understood that in various embodiments it may not be necessary for the vehicle 100 to have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, the vehicle 100 includes a wheel control system 154 that is implemented to perform methods and other functions as disclosed herein relating to reducing passenger motion sickness by generating a rotational speed difference between front and rear tires to pitch the vehicle to offset a road slope.

As will be discussed in greater detail subsequently, the wheel control system 154, in various embodiments, is implemented partially within the vehicle 100, and as a cloud-based service. For example, in one approach, functionality associated with at least one module of the wheel control system 154 is implemented within the vehicle 100 while further functionality is implemented within a cloud-based computing system. Thus, the wheel control system 154 may include a local instance at the vehicle 100 and a remote instance that functions within the cloud-based environment.

Moreover, the wheel control system 154, as provided for within the vehicle 100, functions in cooperation with a communication system 156. In one embodiment, the communication system 156 communicates according to one or more communication standards. For example, the communication system 156 can include multiple different antennas/transceivers and/or other hardware elements for communicating at different frequencies and according to respective protocols. The communication system 156, in one arrangement, communicates via a communication protocol, such as a WiFi, DSRC, V2I, V2V, or another suitable protocol for communicating between the vehicle 100 and other entities in the cloud environment. Moreover, the communication system 156, in one arrangement, further communicates according to a protocol, such as global system for mobile communication (GSM), Enhanced Data Rates for GSM Evolution (EDGE), Long-Term Evolution (LTE), 5G, or another communication technology that provides for the vehicle 100 communicating with various remote devices (e.g., a cloud-based server). In any case, the wheel control system 154 can leverage various wireless communication technologies to provide communications to other entities, such as members of the cloud-computing environment.

Figure 2:
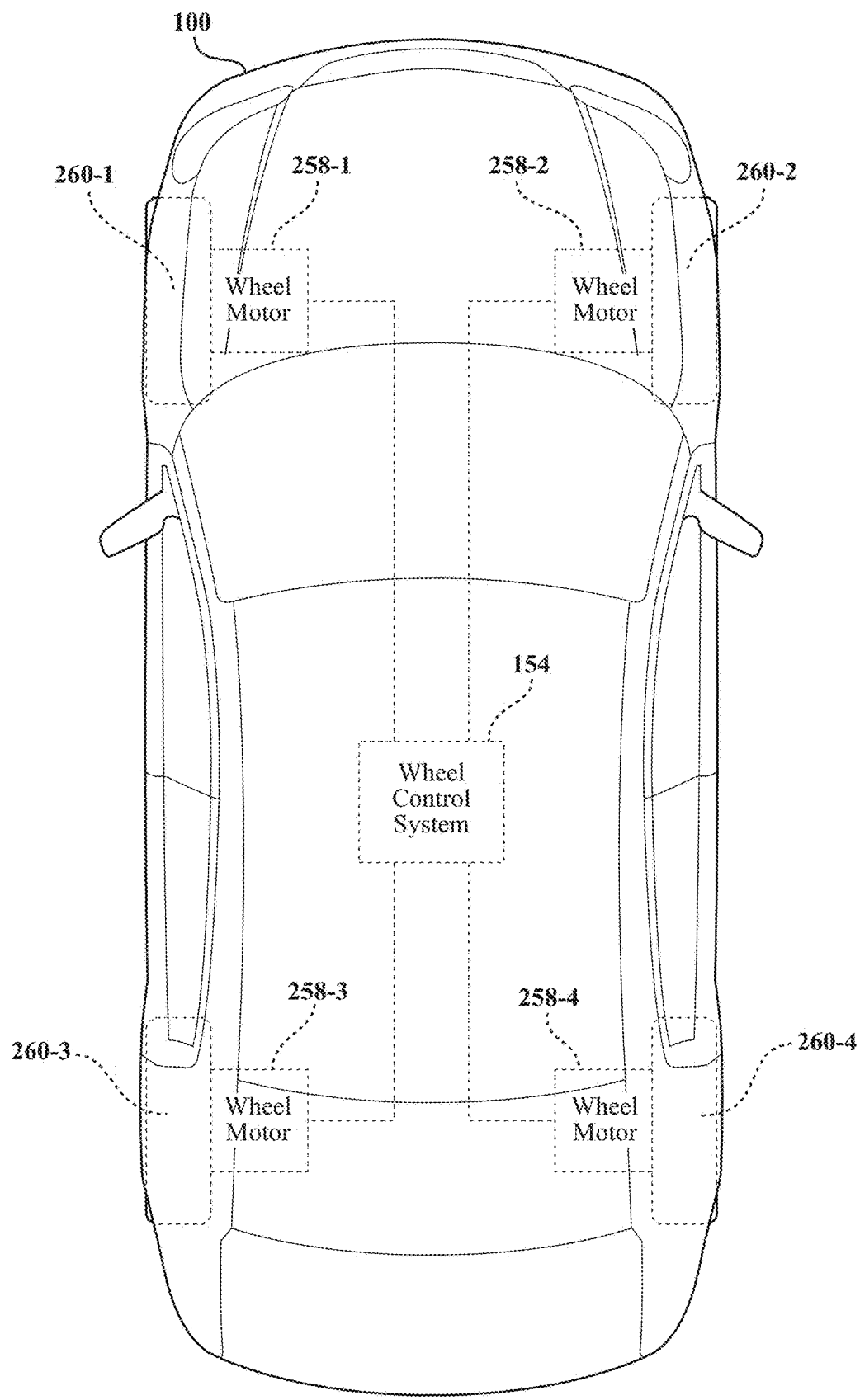
FIG. 2 depicts a vehicle with an independent wheel control system within which systems and methods disclosed herein may be implemented.

FIG. 2 depicts a vehicle 100 with an independent wheel control system 154, within which systems and methods disclosed herein may be implemented. As described above, an over-actuated vehicle is one in which the vehicle has more actuators than degrees of freedom. In a specific example, the vehicle 100 includes multiple wheel motors 258-1, 258-1, 258-3, and 258-4 that each independently provides a torque to a paired wheel 260-1, 260-2, 260-3, and 260-4. Specifically, a first wheel motor 258-1 drives a first wheel 260-1, a second wheel motor 258-2 drives a second wheel 260-2, a third wheel motor 258-3 drives a third wheel 260-3, and a fourth wheel motor 258-4 drives a fourth wheel 260-4. Each wheel 260 may also be independently steerable. The wheels 260 may be steered in different directions, allowing the vehicle 100 to carry out advanced maneuvers. Each wheel 260 may also be coupled to wheel-specific brake systems, and each wheel 260 may be independently slowed down.

As described above, this independent wheel control allows the wheel control system 154 to offset the motion sickness that may arise from vehicle pitch changes over time. For example, the wheels 260 may be rotated at different speeds to induce a vehicle pitch that offsets a road slope. While each vehicle wheel 260 may be independently controlled, paired sets of wheels 260 may be controlled similarly. More specifically, front wheels 260-1 and 260-2 may be controlled to have the same rotational speed, which front wheel rotational speed may be the same as or different than the rotational speed of the rear wheels 260-3 and 260-4. Similarly, the rear wheels 260-3 and 260-4 may be controlled to have the same rotational speed, which rear wheel rotational speed may be the same as or different than the rotational speed of the front wheels 260-1 and 260-2.

In this example, the drive system may be a steer-by-wire system where the control over the wheels 260 is provided through an electronic control unit rather than a mechanically connected steering column and axle. That is, the wheel control system 154 may transmit electronic control signals to the respective wheel motors 258 via electrical lines, which control signals may indicate a particular rotational speed at which the respective wheel 260 is to operate.

Figure 3:
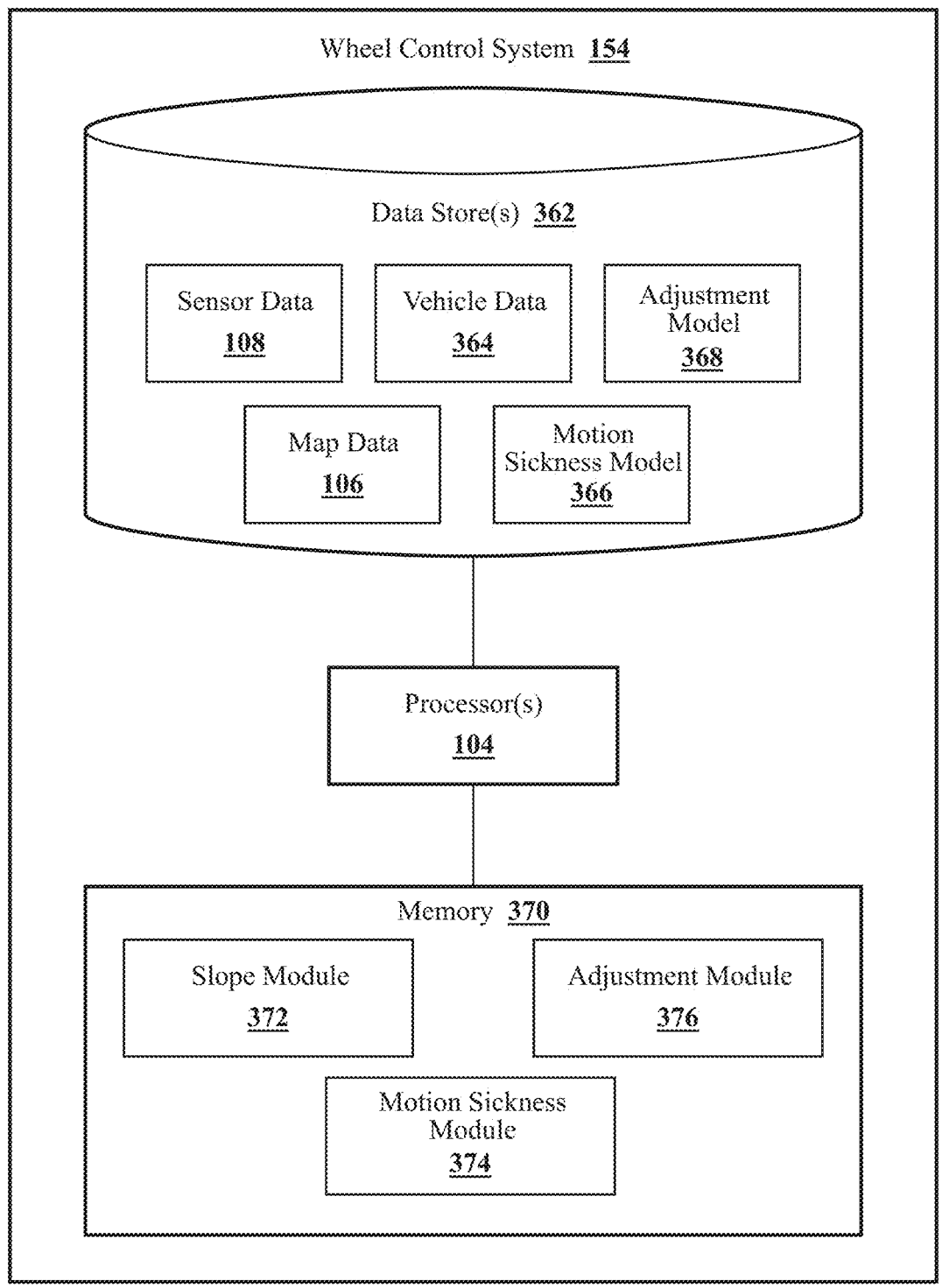
FIG. 3 illustrates one embodiment of a wheel control system that is associated with adjusting a vehicle pitch angle to offset a road slope by independently adjusting vehicle wheel rotational speeds.

With reference to FIG. 3, one embodiment of the wheel control system 154 of FIG. 1 is further illustrated. The wheel control system 154 is shown as including a processor 104 from the vehicle 100 of FIG. 1. Accordingly, the processor 104 may be a part of the wheel control system 154, the wheel control system 154 may include a separate processor from the processor 104 of the vehicle 100, or the wheel control system 154 may access the processor 104 through a data bus or another communication path that is separate from the vehicle 100. In one embodiment, the wheel control system 154 includes a memory 370 that stores a slope module 372, a motion sickness module 374, and an adjustment module 376. The memory 370 is a random-access memory (RAM), read-only memory (ROM), a hard-disk drive, a flash memory, or another suitable memory for storing the modules 372, 374, and 376. The modules 372, 374, and 376 are, for example, computer-readable instructions that, when executed by the processor 104, cause the processor 104 to perform the various functions disclosed herein. In alternative arrangements, the modules 372, 374, and 376 are independent elements from the memory 370 that are, for example, comprised of hardware elements. Thus, the modules 372, 374, and 376 are alternatively application-specific integrated circuits (ASICs), hardware-based controllers, a composition of logic gates, or another hardware-based solution.

Moreover, in one embodiment, the wheel control system 154 includes the data store 362. The data store 362 is, in one embodiment, an electronic data structure stored in the memory 370 or another data storage device and that is configured with routines that can be executed by the processor 104 for analyzing stored data, providing stored data, organizing stored data, and so on. Thus, in one embodiment, the data store 362 stores data used by the modules 372, 374, and 376 in executing various functions. For example, the sensor data 108 may include data from which 1) the slope module 372 may determine a slope of the road and 2) the motion sickness module 374 may determine a motion sickness state of a passenger of the vehicle 100.

In an example, the data store 362 includes environment sensor data. Environment sensor data includes the output of environment sensors 118, such as a radar sensor 120, a LiDAR sensor 122, a sonar sensor 124, or a camera 126, among other environment-detecting sensors. For example, in LiDAR sensing, a laser emits pulsed waves towards the surrounding environment. These pulses bounce off surrounding objects and return to a sensor. A processor 104 determines the distance to an object based on the time between a pulse being transmitted and received. In this example, the LiDAR sensor 122 may be able to determine the topography of a landscape and road. More particularly, the LiDAR sensor 122 may detect upcoming variations in road slope by localizing the road surface at different points in front of the vehicle 100. Similarly, other sensors, such as a radar sensor 120, a sonar sensor 124, and a camera 126, may detect the surrounding environment, and the slope module 372 may analyze the output of these sensors to determine a slope on the road.

In another example, the sensor data 108 may include environment sensor data from other vehicles near the vehicle 100 and/or other vehicles that have traversed the road currently traversed by the vehicle 100. For example, it may be that an ado vehicle in front of the vehicle 100 is currently on a sloped road ahead of the vehicle 100. In this example, sensor data collected by the ado vehicle may be transmitted to the vehicle 100, stored in the data store 362, and relied on by the slope module 372 to detect the slope of the road in front of the vehicle 100. As such, the communication system 156 of the vehicle 100 may facilitate communications between multiple different vehicles to acquire and distribute information between vehicles, such as sensor data 108 indicative of the topography of the road. In an example, the cloud-based environment in which the vehicle 100 is found (i.e., the vehicles within a range of the vehicle 100 from which sensor data is collected) may be a dynamic environment comprising cloud members routinely migrating into and out of a geographic area.

The environment sensor data may also be used, at least in part, to determine whether a passenger is experiencing motion sickness or likely to experience motion sickness. That is, as described above, changes in road slopes may cause motion sickness. Accordingly, the motion sickness module 374 may rely on a detected slope of the road ahead to determine that a passenger may experience or is likely to experience motion sickness.

As another example, the sensor data 108 may include real-time vehicle sensor data. As with the environment sensor data, the vehicle sensor data may indicate a slope of the road and a motion sickness state of an occupant of the vehicle 100. For example, the vehicle pitch angle changes based on the slope angle of the road. Accordingly, in one example, the slope module 372 may infer the slope angle based on a detected pitch of the vehicle 100. For example, the vehicle 100 may include an accelerometer or other inclinometer that detects the change in the inclination angle of the vehicle 100. From this, the slope module 372 may infer the slope of the road, and the motion sickness module 374 may infer or predict a motion sickness state of a passenger.

In an example, the output of the vehicle sensor may be used to verify the accuracy of any motion sickness-countering measure. That is, as described above, adjusting front and rear wheel rotational speeds to generate a difference therebetween results in a change to the pitch of the vehicle. The accelerometer or inclinometer may be used to determine whether the actual adjusted pitch of the vehicle has matched a target value or whether additional wheel speed adjustments are needed to achieve the target value.

As another example, it may be that vehicle vibration triggers motion sickness. In this example, a sensor may detect the vibration of the vehicle chassis. The motion sickness module 374 may rely on this data point to determine whether a passenger is experiencing or is likely to be experiencing motion sickness. While specific reference is made to particular vehicle sensors, the sensor data 108 may include the output of any vehicle sensor 116 from which a motion sickness state or road slope may be determined.

As another example, the sensor data 108 may include the real-time data collected by in-cabin passenger monitoring sensors. The motion sickness module 374 may use data from passenger monitoring sensors to determine the motion sickness state of a passenger. That is, the physical traits/characteristics of a passenger may indicate whether or not the passenger is experiencing motion sickness. Motion sickness-indicating physical traits include pupil dilation, elevated heart rate, nausea, vomiting, cold sweat, pallor, headaches, increased salivation, and speech and movement behaviors. In-cabin monitors such as passenger-facing cameras, heart rate monitors, thermal imaging cameras, galvanic skin response measures, etc., may be used to collect data on a passenger that the motion sickness module 374 relies on in evaluating the motion sickness state of the passenger. In an example, collected data values may be compared to baseline data values for the passenger or threshold values, either of which may form part of the motion sickness model 366. In either case, if one or more measured data values deviate from respective passenger baseline data values or threshold values by a certain amount, the motion sickness module 374 may infer that a passenger is experiencing motion sickness. In an example, the difference in values by which motion sickness is diagnosed may be determined based on machine learning or medical standards.

For example, the motion sickness module 374 may cause the processor 104 to analyze camera images to determine the position/movement of the passenger's eyes, as changes in pupil dilation may indicate a motion sickness state of the passenger. As other example, the motion sickness module 374 may include instructions that cause the processor 104 to analyze the camera images to determine whether a passenger is exhibiting movements indicative of headaches, nausea, vomiting, and/or sweating. As yet another example, the motion sickness module 374 may analyze the camera images to determine the pitch of the passenger relative to the vehicle 100 and, from such, determine whether the passenger is experiencing, or is likely to experience, motion sickness. Similarly, the motion sickness module 374 may analyze the output of other sensors, such as heart rate monitors and galvanic skin response sensors, to determine whether a passenger is experiencing motion sickness or is on the verge of experiencing motion sickness.

In one embodiment, the data store 362 stores the sensor data 108 along with, for example, metadata that characterizes various aspects of the sensor data 108. For example, the metadata can include location coordinates (e.g., longitude and latitude), relative map coordinates or tile identifiers, time/date stamps from when the separate sensor data 108 was generated, and so on.

In one embodiment, the data store 362 further includes map data 106. As described in more detail below in connection with FIG. 1, the map data 106 includes, in at least one approach, maps of one or more geographic areas. In some instances, the map data 106 can include information about the ground, terrain, roads, surfaces, and/or other features of one or more geographic areas, including elevation data in one or more geographic areas. Accordingly, from this map data 106, the slope module 372 may determine the slope of the road and any changes to the slope ahead of the vehicle 100. In one example, the map data 106 may be provided from a map database, which includes information about the topography of a region.

In another example, the map data 106 may be generated based on or supplemented by crowd-sourced vehicle sensor data. As described above, other vehicles have likely traveled the same road that the vehicle 100 is currently traveling and may have collected sensor data indicative of the topography of the road. In this example, map data 106 may be created or supplemented with the topography information detected by environment sensors of these other vehicles and used by the slope module 372 to identify an upcoming slope or slope change in the road that could trigger a motion sickness-countering wheel speed adjustment.

In one embodiment, the data store 362 further includes vehicle data 364. In general, the vehicle data 364 includes the physical characteristics of the vehicle 100 as well as other information about the vehicle that may impact the ability of the vehicle 100 to change wheel speed and/or vehicle pitch. The physical properties of the vehicle 100 may define the wheel rotational speed adjustments. For example, the degree of the vehicle pitch adjustment may be limited by specific vehicle characteristics such as ground clearance and the presence and length of nose and trunk panels. For example, a pickup truck with a higher ground clearance may tolerate a more significant pitch adjustment than a sedan closer to the road surface.

As another example, the relationship between the front/rear wheel rotational speed difference and resultant pitch change may also vary based on vehicle characteristics. For example, a vehicle with a longer wheelbase may have a different pitch adjustment for a given front/rear wheel rotational speed difference compared to a narrower wheelbase. As yet another example, the size of the wheels 260 may impact the determination of the target wheel rotational speeds and the pitch adjustment boundaries. For example, a vehicle with a larger diameter of wheels 260 may trigger a particular rotational speed adjustment to effectuate a particular pitch adjustment. In contrast, a vehicle with wheels 260 with a smaller diameter may trigger a different rotational speed adjustment to effectuate the same pitch adjustment or a different pitch adjustment.

As yet another example, the relationship between front/rear wheel rotational speed difference and a pitch adjustment may vary based on the suspension characteristics of the vehicle 100. For example, a stiffer suspension may trigger a more significant rotation speed difference to effectuate a target pitch adjustment than a vehicle with a softer suspension that may be more likely to pitch based on a given front/rear wheel rotational speed difference. As such, the vehicle data 364 may include these physical properties and other characteristics of the vehicle 100, such that the adjustment module 376 may determine the wheel rotational speed and pitch adjustments specific to the vehicle 100.

In one embodiment, the data store 362 further includes a motion sickness model 366 that may be relied on by the motion sickness module 374 to determine the motion sickness state of a passenger of the vehicle 100. In an example, the motion sickness module 374 may be a machine-learning system that identifies patterns and/or deviations based on previously unseen data. The motion sickness model 366 includes the weights (including trainable and non-trainable), biases, variables, offset values, algorithms, parameters, and other elements relied on by the motion sickness module 374 to output a likely motion sickness state of a passenger of the vehicle 100. For example, certain physical traits and road slope characteristics (e.g., degree of slope, rate of slope change, time-based fluctuation between positive and negative road slopes) may be more strongly correlated with motion sickness. Accordingly, the motion sickness model 366 includes the weights to account for these relationships. That is, the motion sickness model 366 includes the weights, biases, variables, offset values, algorithms, parameters, and other elements by which the motion sickness module 374 processes and analyzes the sensor data 108 and map data 106 to infer a motion sickness state of the passenger of the vehicle 100.

In one example, the motion sickness model 366 may include profile information for a passenger, such as a driver, of the vehicle 100. For example, certain individuals may be biologically more susceptible to motion sickness. As such, profile information for frequent passengers of the vehicle 100 may be stored in the motion sickness model 366 so that passenger-specific adjustments may be made. For example, the profile information may include a mapping between historically measured physical traits indicative of passenger motion sickness and road slope characteristics. As other examples, the profile information may indicate for what road slope angles, what time-based rates of change, and what fluctuation rates between positive and negative slopes the passenger has historically exhibited those physical traits indicative of motion sickness and the severity of motion sickness for the different road conditions.

In an example, the motion sickness model 366 may include similar data for other vehicle operators or passengers. That is, the motion sickness module 374 may be trained on historical information for the passenger and/or other passengers such that the motion sickness module 374 may identify patterns in the behavior of a current passenger, based on historical information, to identify when the passenger is likely experiencing, or will likely experience in the near future, motion sickness.

In one embodiment, the data store 362 further includes an adjustment model 368 that may be relied on by the adjustment module 376 to determine the adjustments to the wheels 260 based on a detected motion sickness state of a passenger and a detected slope of the road. In an example, the adjustment module 376 may be a machine-learning system that identifies patterns and/or deviations based on previously unseen data.

The adjustment model 368 includes the weights (including trainable and non-trainable), biases, variables, offset values, algorithms, parameters, and other elements that operate to output an adjustment value for each wheel. For example, wheel size, wheelbase, suspension characteristics, vehicle ground clearance, and other physical and dimensional properties may define how wheel rotational speeds should be adjusted to effectuate a target pitch adjustment. The adjustment model 368 includes the weights to account for these relationships. That is, the adjustment model 368 includes the weights, biases, variables, offset values, algorithms, parameters, and other elements by which the adjustment module 376 processes and analyzes data and an output of the slope module 372 and motion sickness module 374 to generate a control signal for the wheel motors 258 of the vehicle 100.

In one example, the adjustment model 368 includes historical data for adjustments made and the conditions that triggered the adjustments. That is, the adjustment module 376 may be trained on historical information of detected motion sickness and wheel rotational speed adjustments such that the adjustment module 376 may identify patterns in the detected motion sickness state and road slope, based on historical information, to identify a wheel rotational speed adjustment to counter currently measured motion sickness.

The wheel control system 154 further includes various modules 372, 374, and 376 that carry out various operations to adjust the rotational speed of vehicle wheels 260 to adjust the pitch of the vehicle 100 to reduce the likelihood of motion sickness for the passengers in the vehicle 100.

Specifically, the wheel control system 154 includes a slope module 372 that, in one embodiment, includes instructions that cause the processor 104 to detect a slope in a road in front of the vehicle 100. As described above, detecting a road slope may be based on various data. That is, the slope module 372 may include instructions that cause the processor 104 to detect the slope of the road based on at least one of vehicle sensor data (e.g., vehicle accelerometer data, vehicle inclinometer data, chassis vibration sensor data, etc.), environment sensor data (e.g., LiDAR sensor 122 data, radar sensor 120 data, sonar sensor 124 data, camera 126 data, etc.), map data (i.e., terrain, topography, or elevation data), or crowd-sourced sensor data (i.e., sensor data 108 collected from vehicles in the vicinity of vehicle 100 that have recently traversed the road ahead of the vehicle 100 or that are not in the vicinity of the vehicle 100 but have historically have traversed the road ahead of the vehicle 100). In an example, the slope module 372 may analyze data from multiple of the aforementioned data sources to determine whether the road in front of the vehicle 100 is sloped.

In one example, the slope module 372 may determine characteristics of the slope such as the direction (i.e., ascent or descent), the amount of the slope (e.g., a positive or negative angle relative to an artificial horizon), and the length of the slope. Specific values of these characteristics may trigger and/or dictate the degree of remedial measures. For example, the direction of a slope may dictate which set of wheels 260 (i.e., front or rear) are to be rotated more quickly. As another example, if the amount (i.e., the positive or negative angle relative to horizontal) of the slope is less than a threshold amount (e.g., 0.5 degrees), wheel rotational speed adjustment may be suspended. By comparison, if the amount of the slope is greater than the threshold amount, wheel rotational speed adjustment may be initiated. As such, the slope module 372 may output a calculated angle of the slope, which may be determined by analyzing the sensor data 108.

The slope angle may also define the amount of wheel rotational speed adjustment. For example, a steeper slope may trigger a more significant difference between the front and rear wheel rotational speeds. As another example, if the slope length is less than the threshold amount, wheel rotational speed adjustment may be suspended. By comparison, wheel rotational speed adjustment may be initiated if the slope length is more significant than the threshold amount.

In one particular example, the slope module 372 may output a distance-based slope profile of the road. For example, it may be the case that a road has multiple hills with short but sharp inclines/declines. This may result in a rocking motion of the vehicle 100, which may cause motion sickness in the passengers. In summary, the slope module 372 includes instructions that cause the processor 104 to analyze the various data in the data store 362 to output a slope of a road and, in some examples, characteristics of the slope of the road.

The wheel control system 154 includes a motion sickness module 374 that, in one embodiment, includes instructions that cause the processor 104 to detect a motion sickness state of a passenger of the vehicle 100. In one example, the motion sickness module 374 includes instructions that cause the processor 104 to detect a motion sickness state of any passenger in the vehicle 100 (i.e., the driver and non-driver passengers). In another example, the motion sickness module 374 instructs the processor 104 to detect the motion sickness state of a particular passenger, such as a driver.

As described above, the motion sickness module 374 may include instructions that cause the processor 104 to detect the motion sickness state of the passenger based on at least one of 1) real-time passenger sensor data (as collected from in-cabin sensors), 2) real-time vehicle sensor data (e.g., vehicle accelerometer, vehicle inclinometer, chassis vibration sensor), and historical passenger profile data (e.g., historical instances of motion sickness, road slope conditions that triggered motion sickness, and severity of motion sickness under various road slope conditions). That is, the motion sickness module 374 may include instructions that cause the processor 104 to analyze the various data in the data store 362 to output a motion sickness state of a passenger of the vehicle 100.

In an example, the output may indicate that the passenger is currently experiencing motion sickness. That is, the currently detected physical traits may indicate motion sickness. In another example, the output may indicate that the passenger will likely experience motion sickness. For example, the slope module 372 may indicate that while the vehicle 100 is not yet on a slope, the road in front of the vehicle 100 has a slope. Moreover, the physical traits currently detected by the in-cabin sensors, while not presently indicating motion sickness, may have values that are precursors to motion sickness. As another example of predicting motion sickness, the historical profile data for the passenger may indicate a susceptibility to motion sickness. Based on this susceptibility and the detected upcoming conditions of the road, the motion sickness module 374 may predict that the passenger will likely experience motion sickness.

In one example, the motion sickness module 374 may output a binary indication of motion sickness. That is, the motion sickness module 374 may analyze various instances of sensor data that each may indicate motion sickness. If one or more of the metrics is greater than a threshold value/baseline value or different by some threshold amount than a threshold value/baseline value, the motion sickness module 374 may indicate that the passenger is experiencing motion sickness.

In one example, the output, rather than a binary indicator, may indicate a degree of motion sickness experienced or likely to be experienced. For example, the measured values relative to the threshold value/baseline value may be quantified, with a greater difference or absolute measure indicating more severe motion sickness than a slighter or lower absolute measure. The degree of motion sickness may be based, at least in part, on the motion sickness model 366, which includes the weights, variables, biases, etc., by which the motion sickness module 374 evaluates the severity of motion sickness. The adjustment amount to the wheel rotational speed may be based on the severity of motion sickness (i.e., the severity of the motion sickness state). That is, a more severe case of motion sickness may trigger a more significant difference between wheel set rotational speeds to effect a larger offsetting vehicle pitch. Moreover, in some examples, the degree of motion sickness may determine whether any wheel speed adjustment is carried out. For example, if the motion sickness is below a threshold, wheel rotational speed adjustment may be suspended. By comparison, wheel rotational speed may be initiated if the motion sickness state is more significant than a threshold.

In one approach, the motion sickness module 374 implements and/or otherwise uses a machine learning algorithm. A machine-learning algorithm generally identifies patterns and deviations based on previously unseen data. In the context of the present application, a machine-learning motion sickness module 374 relies on some form of machine learning, whether supervised, unsupervised, reinforcement, or any other type, to infer a motion sickness state of a passenger of the vehicle based on at least one of sensor data 108, map data 106, and vehicle data 364.

In one particular example, the machine-learning model may be a neural network that includes any number of 1) input nodes that receive data, 2) hidden nodes, which may be arranged in layers connected to input nodes and/or other hidden nodes and which include computational instructions for computing outputs, and 3) output nodes connected to the hidden nodes which generate an output indicative of the motion sickness state of a passenger of the vehicle 100.

In one configuration, the machine learning algorithm is embedded within the motion sickness module 374, such as a convolutional neural network (CNN) or an artificial neural network (ANN) to perform motion sickness state classification over the data from which further information is derived. Of course, in further aspects, the motion sickness module 374 may employ different machine learning algorithms or implement different approaches for performing the motion sickness state determination, which can include logistic regression, a naïve Bayes algorithm, a decision tree, a linear regression algorithm, a k-nearest neighbor algorithm, a random forest algorithm, a boosting algorithm, and a hierarchical clustering algorithm among others to generate motion sickness state determinations. Other examples of machine learning algorithms include but are not limited to deep neural networks (DNN), including transformer networks, convolutional neural networks, recurrent neural networks (RNN), Support Vector Machines (SVM), clustering algorithms, Hidden Markov Models, and so on. It should be appreciated that the separate forms of machine learning algorithms may have distinct applications, such as agent modeling, machine perception, and so on.

Moreover, it should be appreciated that machine learning algorithms are generally trained to perform a defined task. Thus, the training of the machine learning algorithm is understood to be distinct from the general use of the machine learning algorithm unless otherwise stated. That is, the wheel control system 154 or another system generally trains the machine learning algorithm according to a particular training approach, which may include supervised training, self-supervised training, reinforcement learning, and so on. In contrast to training/learning of the machine learning algorithm, the wheel control system 154 implements the machine learning algorithm to perform inference. Thus, the general use of the machine learning algorithm is described as inference.

It should be appreciated that the motion sickness module 374, in combination with the motion sickness model 366 can form a computational model such as a neural network model. In any case, the motion sickness module 374, when implemented with a neural network model or another model in one embodiment, implements functional aspects of the motion sickness model 366 while further aspects, such as learned weights, may be stored within the data store 362. Accordingly, the motion sickness model 366 is generally integrated with the motion sickness module 374 as a cohesive functional structure.

Figure 4A:
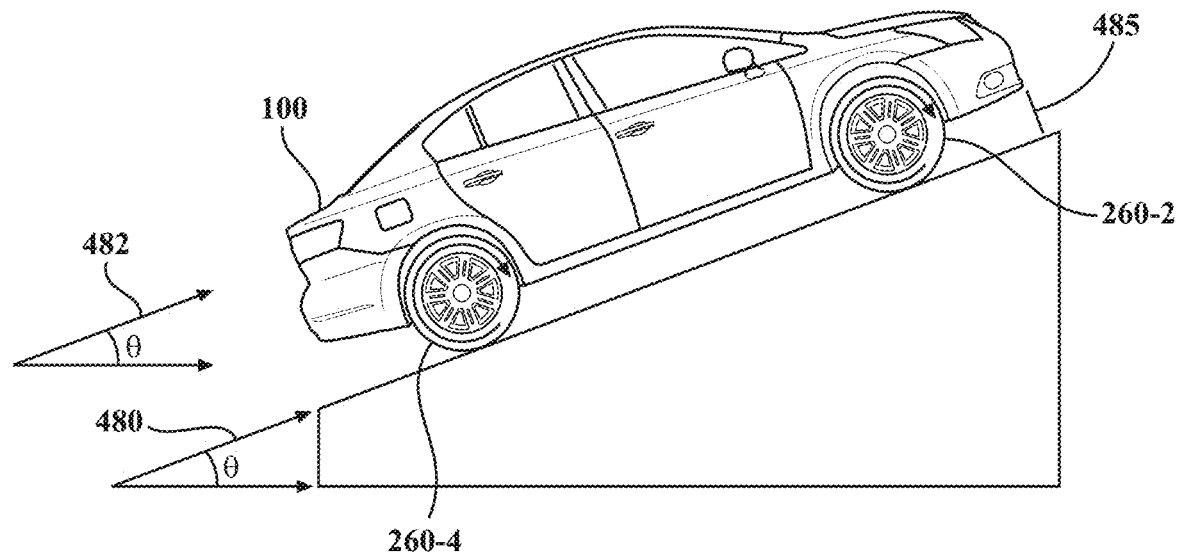
FIGS. 4A and 4B depict a vehicle traveling up a positive slope and the operation of the wheel control system to adjust the vehicle pitch angle.

The wheel control system 154 includes an adjustment module 376 that, in one embodiment, includes instructions that cause the processor 104 to adjust, based on the motion sickness state of the passenger, a pitch of the vehicle 100 to offset a slope angle of the road by independently adjusting a rotational speed of different wheels 260 of the vehicle 100 to generate a difference between a front wheel rotational speed of the vehicle 100 and a rear wheel rotational speed of the vehicle 100. That is, as depicted in FIG. 4A, when a vehicle 100 travels uphill, the pitch of the vehicle 100 changes with the slope of the road. This change in pitch of the vehicle 100 may cause the passenger to experience motion sickness. Accordingly, the wheel control system 154 adjusts the pitch of the vehicle 100 to counter the road slope, thus reducing the effects of motion sickness a passenger may experience. This may be done by changing the rotational speed of wheels 260 of the vehicle 100 to generate a difference between the rotational speed of the front wheels 260-1 and 260-2 and the rotational speed of the rear wheels 260-3 and 260-4. This front/rear wheel rotational speed difference causes the vehicle 100 to pitch. The rotational speed difference may be set such that the vehicle pitch offsets the road slope. Thus, the adjustment module 376 determines how fast the different wheels should rotate to effectuate a vehicle pitch that offsets the slope of the road.

In an example, the adjustment module 376 includes instructions that cause the processor 104 to adjust the rotational speed of different wheels 260 based on the degree of motion sickness of the passenger. For example, a passenger with a slightly elevated heart rate and a first amount of perspiration may indicate that the passenger is exhibiting mild motion sickness. By comparison, a passenger with a more elevated heart rate, greater perspiration, and skin pallor may be experiencing a more severe case of motion sickness. As described above, the motion sickness module 374 may determine a degree of motion sickness of a passenger. In this example, a more significant adjustment to the pitch/wheel rotational speed may be effectuated with the amount of adjustment being determined from a database mapping and/or machine learning.

In an example, the adjustment module 376 includes instructions that cause the processor 104 to adjust the pitch of the vehicle 100 based on at least one of the slope angle value or a vehicle characteristic. It may be that adjustment is triggered based on whether or not the slope is more significant than a predetermined amount for a predetermined length of time. This may prevent the system from adjusting for small changes in road slope, such as speed bumps. For example, for a road slope that is less than 10 feet in length and has a slope of less than 2%, the adjustment module 376 may suspend wheel rotational speed adjustment. In another example, the angle of the slope may determine the degree of wheel rotational speed adjustment. For example, for a road slope of 10%, a more pronounced front/wheel rotational speed difference may be implemented (e.g., 500 rotations per minute (rpm) difference between a front wheel and a rear wheel rotational speed) as compared to the difference triggered by a road slope of 5% (e.g., 250 rpm difference between a front wheel and a rear wheel rotational speed). Note that assuming a speed range between 30-120 km/h, wheel rotational speeds may vary between 400-1600 rpm. As such, the wheel speed rotational adjustment amount may be any amount in this range or any other range.

Figure 4B:
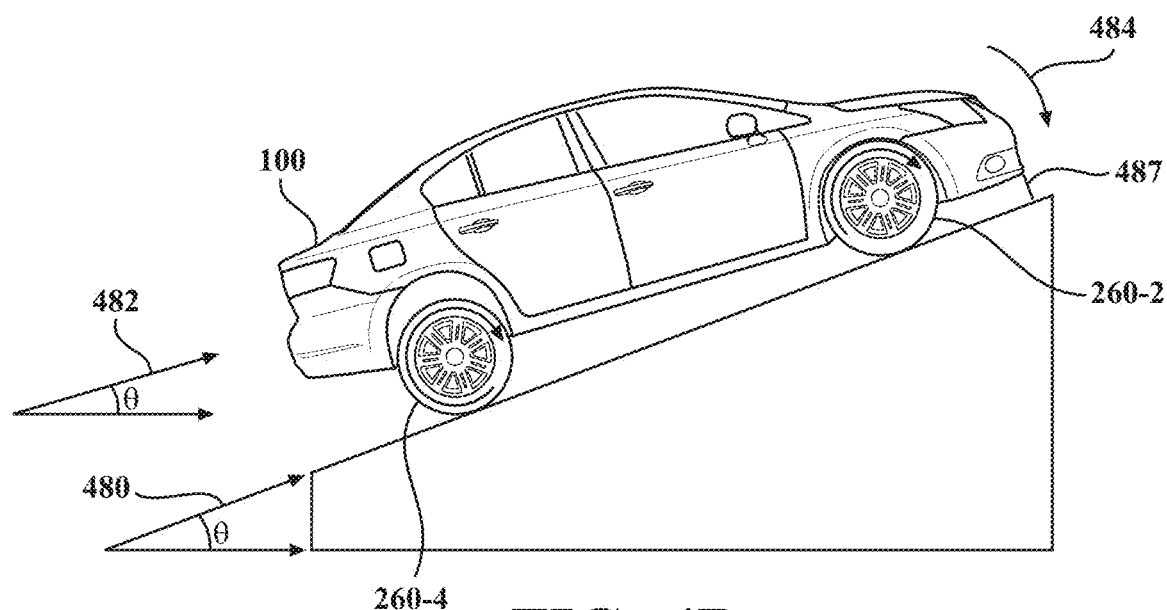
Figure 5A:
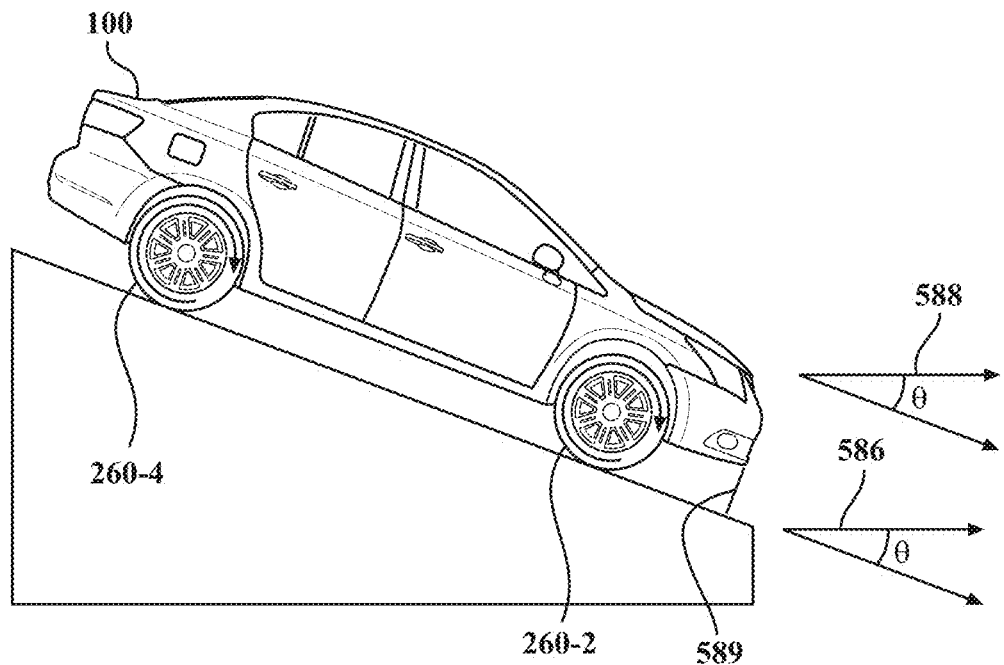
FIGS. 5A and 5B depict a vehicle traveling down a negative slope and the operation of the wheel control system to adjust the vehicle pitch angle.
Figure 5B:
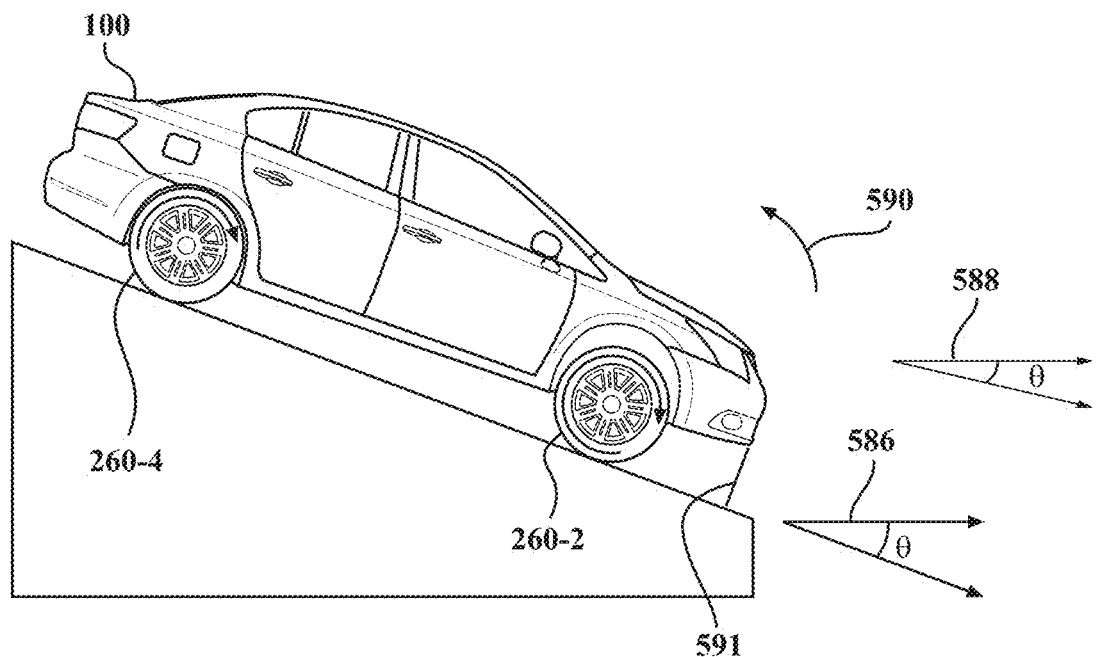

In an example, generating the rotational speed difference is based on the direction of the slope (e.g., positive slope vs. negative slope). For example, when the slope angle is positive (i.e., a vehicle travels uphill as depicted in FIG. 4A), the adjustment module 376 adjusts the rotational speed such that the rotational speed of the front wheels 260-1 and 260-2 is less than the rotational speed of the rear wheels 260-3 and 260-4. This causes the vehicle 100 to pitch down (i.e., the nose of the vehicle 100 drops) to offset the road slope, as depicted in FIG. 4B. By comparison, when the slope angle is negative (i.e., a vehicle 100 travels downhill as depicted in FIG. 5A), the adjustment module 376 adjusts the rotational speed such that the rotational speed of the front wheels 260-1 and 260-2 is greater than the rotational speed of the rear wheels 260-3 and 260-4. This causes the vehicle 100 to pitch up (i.e., the nose of the vehicle 100 rises) to offset the road slope, as depicted in FIG. 5B.

The vehicle characteristics may also determine how much wheel speed is to be adjusted to effectuate a target vehicle pitch and to what extent the vehicle pitch may be adjusted. For example, a vehicle with a stiffer suspension may trigger a more significant wheel speed difference to achieve a target vehicle pitch than a vehicle with a softer suspension. As another example, a vehicle with a longer wheelbase may trigger a more significant wheel speed difference to achieve a target vehicle pitch than a vehicle with a shorter wheelbase. As another example, certain vehicle characteristics such as ground clearance and the presence and extension of the vehicle beyond the wheelbase may determine a boundary on pitch adjustments that may be made. For example, a vehicle with a greater section of the vehicle behind the rear wheel and with a low ground clearance may not be able to modulate pitch as much on account of the rear section of the vehicle potentially dragging on the road if too significant an adjustment is made. As such, the adjustment module 376, based on vehicle data 364, determines how to adjust wheel speeds to achieve a target vehicle pitch adjustment. As the adjustment is based on the slope of the road and the motion sickness state of a passenger of the vehicle 100, the adjustment module 376 is operatively coupled to receive the output of the slope module 372 and the motion sickness module 374.

As a specific example, the adjustment module 376 includes instructions that cause the processor 104 to determine a target pitch adjustment for the vehicle 100. The target pitch adjustment may be selected based on several factors, including the slope of the road, the exhibition, and severity of motion sickness in a passenger (such as the driver) of the vehicle, boundaries defined by vehicle characteristics, and others. For example, a more greatly sloped road and a more severe case of motion sickness may trigger a greater target pitch adjustment.

The adjustment module 376 may also include instructions that cause the processor 104 to determine a target difference between the front wheel rotational speed and the rear wheel rotational speed based on the target pitch adjustment. For example, for a target pitch adjustment of the vehicle 100 of −1 degree (i.e., the vehicle 100 is traveling uphill, and the offsetting target pitch adjustment is meant to drop the vehicle 100 pitch by 1 degree), the adjustment module 376 may indicate a wheel speed rotational difference of 100 rpm. The relationship between the target pitch adjustment and the target difference between the front wheel rotational speed and the rear wheel rotational speed may be determined in various ways. For example, the vehicle data 364 may include vehicle-specific mappings between wheel rotational speed and pitch adjustments, which mappings may account for various vehicle characteristics and may be algebraically calculated. For example, the pitch angle may be approximated based on the vehicle deceleration and vehicle properties such as a center of gravity and wheelbase. The relationship between pitch angle, $P_a$, and vehicle deceleration may be provided as $\tan(P_a)=(a/g)*(h/L)$ where a is the vehicle deceleration, g is gravity (e.g., 9.8 m/s$^2$), h is the ground clearance of a vehicle, and L is the wheelbase of the vehicle. The value a may be converted into a vehicle speed. For example, a wheel speed reduction of 20 kilometers per hour (km/h) over 2 seconds may result in an acceleration, a, of −2.7 m/s$^2$.

Given that rotational speed may be calculated as: rpm [rev/min]=speed [m/s]*60 [s/min]/2πr [m], the adjustment module 376 may determine a target rpm adjustment for a given target pitch adjustment. For example, given a target desired pitch adjustment of 3 degrees, and a vehicle having a ground clearance, h, of 0.5 meters (m), a wheelbase, L, of 2.5 m, a wheel diameter of 40 centimeters (cm), and a deceleration range of between −3.5 and −0.5 m/s$^2$, using the relationship, $\tan(P_a)=(a/g)*(h/L)$, the adjustment module 376 may identify the value a as −2.7 m/s$^2$. From this, and the relationships between acceleration, vehicle speed, and rpm (e.g., rpm [rev/min]=speed [m/s]*60 [s/min]/2πr [m]), the adjustment module 376 may determine a target rpm difference between the front and rear wheels to be 270 rpm. Using this information, the adjustment module 376 controls the front wheels and rear wheels to effectuate this rpm difference and achieve the target pitch adjustment of 3 degrees.

In another example, the relationship may be determined experimentally based on collected data as vehicles travel. That is, vehicles with particular characteristics may be subject to different front/rear wheel rotational speed differences, and the pitch modulation may be recorded. The adjustment module 376 may rely on this wheel speed difference to pitch modulation relationship (which may be stored in the adjustment model 368) to determine a target wheel speed difference for a detected road slope.

The output of the adjustment module 376 may take a variety of forms. That is, to generate the target wheel rotational speed difference, the adjustment module 376 may adjust 1) the rotational speed of the front wheels 260-1 and 260-2 of the vehicle 100, 2) the rotational speed of the rear wheels 260-3 and 260-4 of the vehicle 100, or 2) adjust the rotational speed of both the front wheels 260-1 and 260-2 of the vehicle 100 and the rear wheels 260-3 and 260-4 of the vehicle 100. For example, given an intended result to have the front wheels rotating faster than the rear wheels by 100 rpm (to bring the nose of the vehicle 100 up as when traveling on a downhill slope), the adjustment module 376 may output a control signal which 1) decreases the front wheel 260-1 and 260-2 rotational speed by 100 rpm, 2) increases the rear wheel 260-3 and 260-4 rotational speed by 100 rpm, or 3) decreases the front wheel 260-1 and 260-2 rotational speed and increases the rear wheel 260-3 and 260-4 rotational speed by different amounts to achieve an overall difference of 100 rpm. In any case, the adjustment may be made such that the rotational speeds of both front wheels 260-1 and 260-2 are the same, and the rotational speeds of both rear wheels 260-3 and 260-4 are the same.

It should be noted that these adjustments are relative to the existing rotational speed of the wheels. For example, suppose the wheels are rotating at 1,060 rpm, and it is desired that the front wheels 260-1 and 260-2 rotate slower than the rear wheels 260-3 and 260-4. In that case, the adjustment module 376 may generate control signals that 1) decrease the front wheel 260-1 and 260-2 rotational speed to 960 rpm, 2) increase the rear wheel 260-3 and 260-4 rotational speed to 1160 rpm, or 3) decrease the front wheel 260-1 and 260-2 rotational speed and increase the rear wheel 260-3 and 260-4 rotational speed by different amounts to achieve an overall difference of 100 rpm. Moreover, this rotational speed difference may be maintained responsive to a driver-based acceleration input. That is, the adjustment module 376 includes instructions that cause the processor 104 to maintain the difference between the front wheel rotational speed and the rear wheel rotational speed responsive to the driver-based acceleration input.

In any case, the adjustment module 376 includes instructions that cause the processor 104 to set the rotational speed of the front wheels 260-1 and 260-2 and the rotational speed of the rear wheels 260-3 and 260-4 based on the target difference. The control signals are passed to the corresponding wheel motors 258-1, 258-2, 258-3, and 258-4.

In an example, once the vehicle 100 has returned to a sub-threshold sloped portion of the road, or the passenger no longer exhibits physical traits indicative of motion sickness, the adjustment module 376 may return the wheels 260 to their pre-modulated rotational speeds. That is, the adjustment module 376 includes instructions that, when executed by the processor, cause the processor to align the front wheel rotational speed and the rear wheel rotational speed to be responsive to the slope angle of the road being less than a threshold amount.

In one approach, the adjustment module 376 implements and/or otherwise uses a machine learning algorithm. In the context of the present application, a machine-learning adjustment module 376 relies on some form of machine learning, whether supervised, unsupervised, reinforcement, or any other type, to infer a wheel rotational speed adjustment based on at least one of sensor data 108, map data 106, vehicle data 364, a detected slope, and a detected motion sickness state.

In one particular example, the machine-learning model may be a neural network that includes any number of 1) input nodes that receive data, 2) hidden nodes, which may be arranged in layers connected to input nodes and/or other hidden nodes and which include computational instructions for computing outputs, and 3) output nodes connected to the hidden nodes which generate an output indicative of the wheel speed adjustments.

In one configuration, the machine learning algorithm is embedded within the adjustment module 376, such as a CNN or an ANN to perform wheel speed adjustment determination over the data from which further information is derived. Of course, in further aspects, the adjustment module 376 may employ different machine learning algorithms or implement different approaches for performing the wheel speed adjustment determination.

It should be appreciated that the adjustment module 376, in combination with the adjustment model 368, can form a computational model such as a neural network model. In any case, the adjustment module 376, when implemented with a neural network model or another model, in one embodiment, implements functional aspects of the adjustment module 376 while further aspects, such as learned weights, may be stored within the data store 362. Accordingly, the adjustment model 368 is generally integrated with the adjustment module 376 as a cohesive functional structure.

FIGS. 4A and 4B depict a vehicle 100 traveling up a positive slope and the wheel control system 154 operation to adjust the vehicle pitch. As depicted in FIG. 4A, the vehicle 100 is traveling up a positive road slope having a slope angle 480. As the vehicle 100 travels along the road, the positive pitch angle 482 of the vehicle 100 may roughly match the road slope. While traveling along the road, the wheel control system 154 may be controlling all the vehicle wheels 260-1, 260-2, 260-3, and 260-4 to rotate at the same speed, albeit each wheel 260 is independently controlled via respective wheel motors 258-1, 258-2, 258-3, and 258-4. As depicted in FIG. 4A, the front of the vehicle 100 has a clearance from the road identified by the first height indicia 485.

The pitch angle of the vehicle 100, or the change of the pitch angle of the vehicle 100 over time, may induce motion sickness in a passenger of the vehicle 100. Accordingly, as described above, responsive to a detected motion sickness state of a passenger being passed a threshold amount and based on the slope of the road, the wheel control system 154 may reduce the rotational speed of the front wheels 260-1 and 260-2 as indicated by the smaller rotational arrows in FIG. 4B. This, in effect, drops the nose of the vehicle 100 as depicted by the arrow 484 such that the front of the vehicle 100 has a reduced clearance from the road as indicated by the second height indicia 487. This reduces the vehicle positive pitch angle 482, as depicted in FIG. 4B. Thus, as demonstrated, the operation of the wheel control system 154 of the present specification reduces the pitch of the vehicle 100 to offset the motion sickness effect that a road slope or change in road slope may induce in a passenger of a vehicle 100.

FIGS. 5A and 5B depict a vehicle 100 traveling down a negative slope and the wheel control system 154 operation to adjust the vehicle pitch. As depicted in FIG. 5A, the vehicle 100 is traveling down a negative road slope having a slope angle 586. As the vehicle travels along the road, the negative pitch angle 588 of the vehicle 100 may roughly match the road slope. While traveling along the road, the wheel control system 154 may be controlling all the vehicle wheels 260-1, 260-2, 260-3, and 260-4 to rotate at the same speed, albeit each wheel 260 is independently controlled via respective wheel motors 258-1, 258-2, 258-3, and 258-4. As depicted in FIG. 5A, the front of the vehicle 100 has a clearance above the road identified by the third height indicia 589.

The pitch angle of the vehicle, or the change of the pitch angle of the vehicle 100 over time, may induce motion sickness in a passenger of the vehicle 100. Accordingly, as described above, responsive to a detected motion sickness state of a passenger being past a threshold amount and based on the slope of the road, the wheel control system 154 may reduce the rotational speed of the rear wheels 260-3 and 260-4 as indicated by the smaller rotational arrows in FIG. 5B. This raises the nose of the vehicle 100 as depicted by the arrow 590 such that the front of the vehicle 100 has an increased clearance from the road, as indicated by the fourth height indicia 591. This reduces the vehicle negative pitch angle 588, as depicted in FIG. 5B. Thus, as demonstrated the operation of the wheel control system 154 of the present specification, the pitch of the vehicle 100 is reduced to offset the motion sickness effect that a road slope or change in road slope may induce in a passenger of a vehicle 100.

Figure 6:
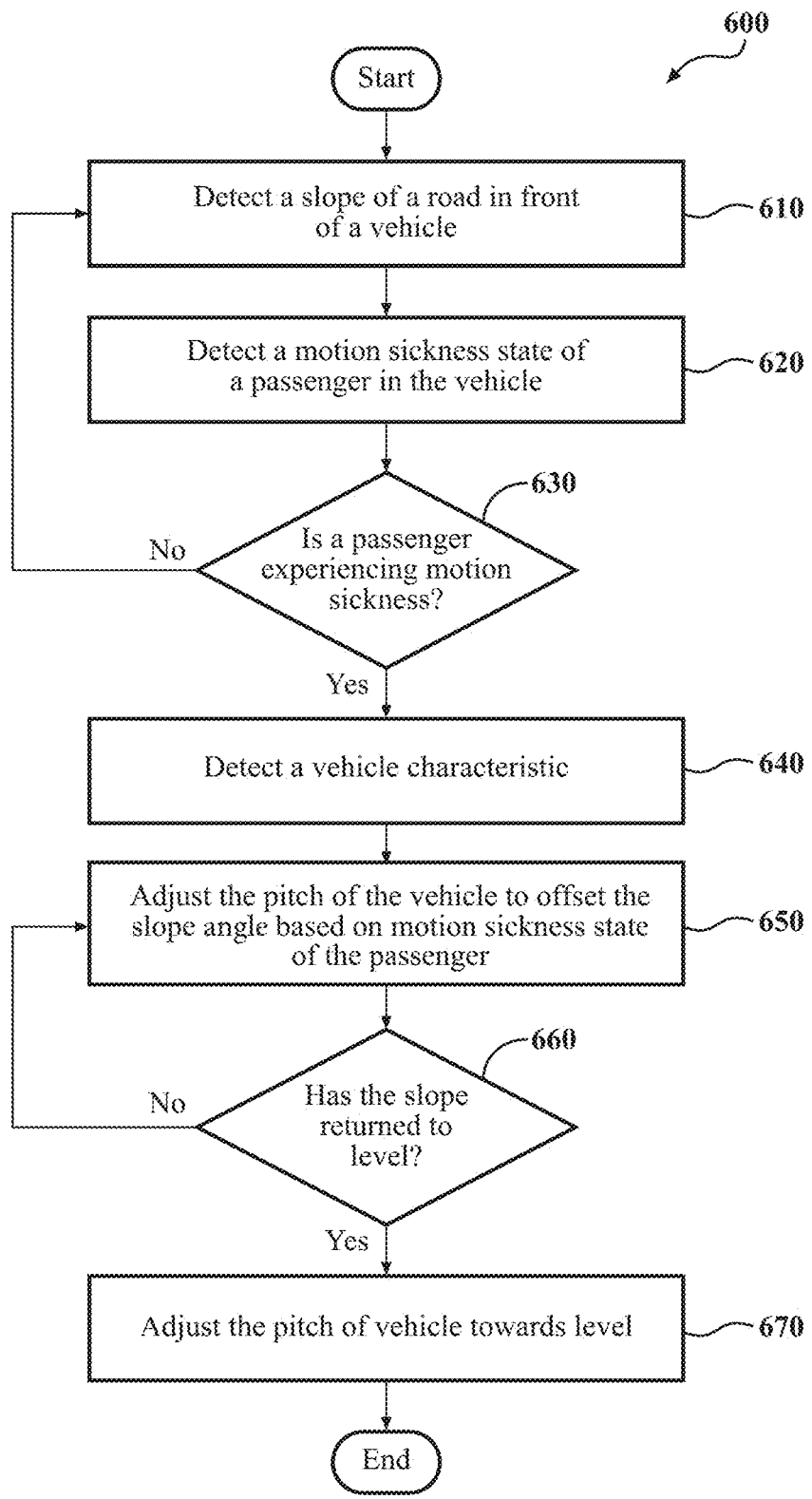
FIG. 6 illustrates a flowchart for one embodiment of a method that is associated with adjusting a vehicle pitch angle to offset a road slope by independently adjusting vehicle wheel rotational speeds.

Additional aspects of adjusting wheel speed rotation to reduce passenger motion sickness will be discussed in relation to FIG. 6. FIG. 6 illustrates a flowchart of a method 600 that is associated with adjusting vehicle pitch via generating a front/rear wheel rotational speed difference, which pitch adjustment offsets a road slope to reduce the effects of slope-based motion sickness in a passenger of the vehicle 100. Method 600 will be discussed from the perspective of the wheel control system 154 of FIGS. 1 and 2. While method 600 is discussed in combination with the wheel control system 154, it should be appreciated that the method 600 is not limited to being implemented within the wheel control system 154 but is instead one example of a system that may implement the method 600.

At 610, the wheel control system 154, particularly the slope module 372, detects a slope of the road in front of a vehicle 100. As described above, this may be based on various data, including environment sensor 118 data, vehicle sensor 116 data, and map data 106. In some examples, the map data 106 may be generated from, or supplemented by, crowd-sourced data such as sensor data collected by other vehicles that have traversed the region where the vehicle 100 is found. In addition to detecting the slope of the road, the slope module 372 may determine characteristics of the slope, which may be used to determine the adjustments to wheel rotational speeds. Examples of characteristics include the length of the slope, whether it is an uphill or downhill slope, the angle of the slope, and a profile of a portion of the road in front of the vehicle 100.

At 620, the wheel control system 154, particularly the motion sickness module 374, detects the motion sickness state of a passenger in the vehicle 100. As described above, the motion sickness state of a passenger may trigger the adjustment of wheel rotational speeds, and various physical and environmental conditions may indicate whether or not a passenger is experiencing motion sickness. As such, the motion sickness module 374 receives sensor data such as camera images, vehicle dynamic data, environmental sensor data, and profile information for vehicle passengers and determines whether a passenger is experiencing or is likely to experience motion sickness.

At 630, the motion sickness module 374 generates an output indicating whether the passenger is experiencing motion sickness and/or the degree of motion sickness. If the motion sickness module 374 determines that the passenger is not experiencing motion sickness, the system continues to monitor the road's slope and the passenger's motion sickness state.

If the motion sickness module 374 determines that the passenger is experiencing motion sickness, at 640, the adjustment module 376 detects a vehicle characteristic. That is, as described above, vehicle characteristics such as suspension characteristics, wheelbase, wheel size, and an extension of the vehicle beyond the front and rear wheels may, in part, define the adjustments to the pitch/wheel rotational speed of the vehicle.

At 650, the adjustment module 376 adjusts the pitch of the vehicle 100 to offset the slope angle based on the motion sickness state of the passenger. That is, the adjustment module 376 alters the rotational speed of at least one of the front wheels 260-1 and 260-2, the rear wheels 260-3 and 260-4, or both, to generate a front/rear wheel rotational speed difference which causes the vehicle 100 nose to pitch up or down to offset a downhill or uphill slope respectively.

Note that the present system adjusts the vehicle pitch to offset a road slope such that a passenger of the vehicle 100 feels the effects of slope-induced motion sickness less severely. As such, at 660, the slope module 372 determines if the slope has returned to within a threshold angle relative to horizontal. If not, the adjustment module 376 maintains the altered wheel speeds to offset the road slope. If the road slope has returned to within a threshold angle relative to horizontal, at 670, the adjust module 376 adjusts the pitch of the vehicle toward level. This may include aligning the rotational speeds of the four independently controlled wheels 260-1, 260-2, 260-3, and 260-4 of the vehicle 100.

In an example, the wheel control system 154 controls the sensors to acquire the sensor data 108 at successive iterations or time steps. Thus, the wheel control system 154, in one embodiment, iteratively executes the functions discussed at blocks 610-670 to acquire the sensor data 108 and provide information therefrom. Furthermore, the wheel control system 154, in one embodiment, executes one or more of the noted functions in parallel for separate observations in order to maintain updated perceptions.

Figure 7:
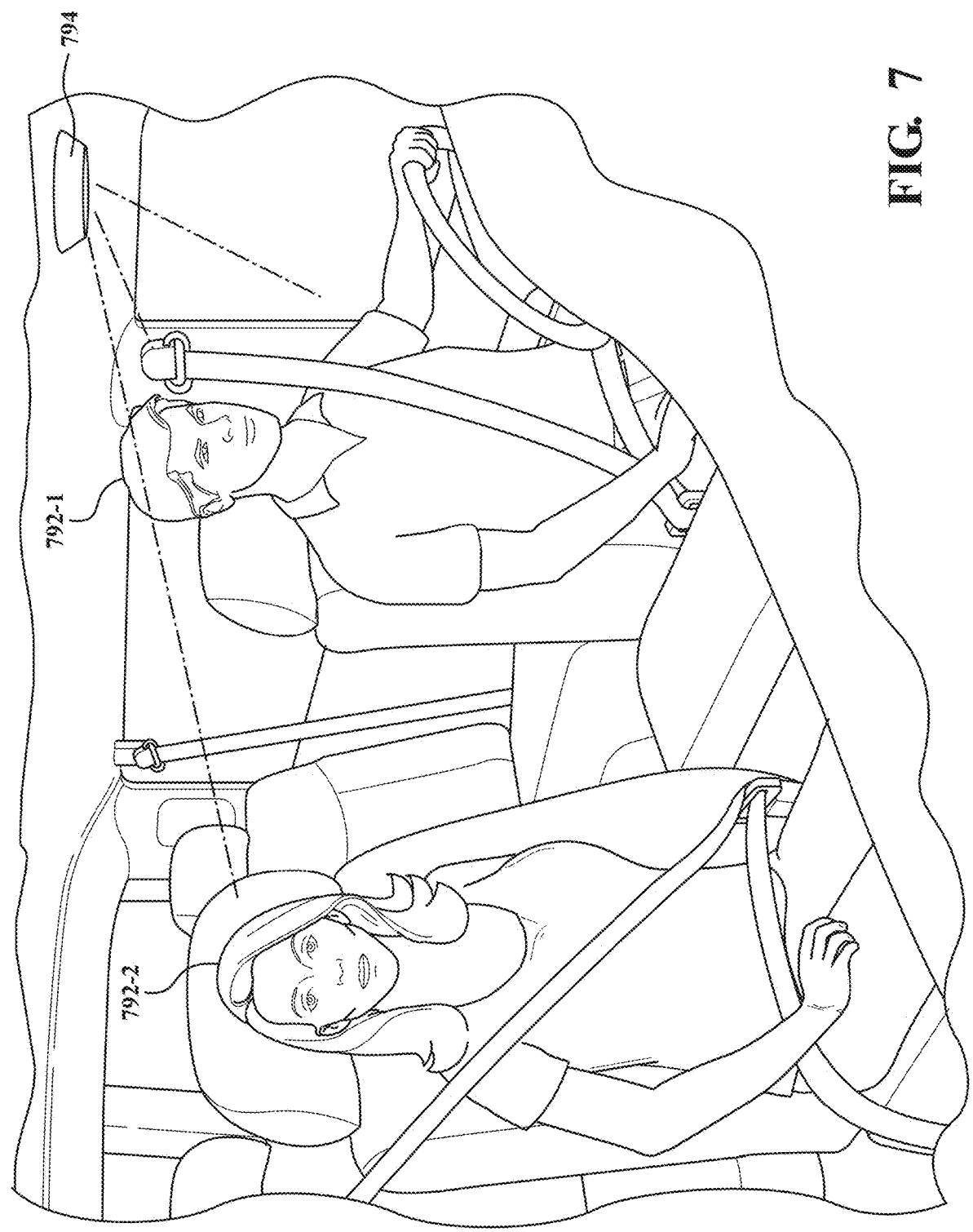
FIG. 7 depicts an example of a sensor system to detect a passenger motion sickness state.

FIG. 7 depicts an example of a sensor system to detect a passenger motion sickness state. As described above, the wheel control system 154 implements wheel rotational speed adjustments based on the motion sickness state of the passengers 792-1 and 792-2 in a vehicle 100. In one particular example, the adjustments may be made based on any of the passengers 792-1 and 792-2 in the vehicle 100 experiencing motion sickness. In another example, a particular passenger, i.e., the driver, is the trigger for wheel rotational speed adjustment. FIG. 7 depicts one example of a device, e.g., a camera 794 that faces the passengers 792-1 and 792-2, from which a motion sickness determination may be made. As described above, a passenger 792 may exhibit various physical characteristics/traits indicative of motion sickness, such as nausea, pallor, perspiration, and pupil dilation. Moreover, other behaviors, such as fidgeting, conversational patterns, etc., may also indicate motion sickness. Accordingly, in these examples, the camera 794, or another sensor such as a thermal imaging camera, may be used to detect those physical characteristics indicative of motion sickness such that a sickness-specific adjustment may be made.

As such, the present wheel control system 154 enhances a passenger's experience while driving in a vehicle 100. More specifically, the wheel control system 154 prevents or reduces the potentially uncomfortable and dangerous side effects of motion sickness by reducing the severity of vehicle pitch adjustments that may occur as a vehicle 100 drives along an uneven road. This is done by independently adjusting the rotational speed of different wheels 260-1, 260-2, 260-3, and 260-4 of an over-actuated vehicle such that the front set and rear sets of wheels rotate at different speeds, which causes the vehicle to pitch (i.e., the nose of the vehicle dips or raises) in a fashion to offset the slope of a road.

FIG. 1 will now be discussed in full detail as an example environment within which the system and methods disclosed herein may operate. In some instances, the vehicle 100 is configured to switch selectively between an autonomous mode, one or more semi-autonomous modes, and/or a manual mode. "Manual mode" means that all of or a majority of the control and/or maneuvering of the vehicle is performed according to inputs received via manual human-machine interfaces (HMIs) (e.g., steering wheel, accelerator pedal, brake pedal, etc.) of the vehicle 100 as manipulated by a user (e.g., human driver). In one or more arrangements, the vehicle 100 can be a manually-controlled vehicle that is configured to operate in only the manual mode.

In one or more arrangements, the vehicle 100 implements some level of automation in order to operate autonomously or semi-autonomously. As used herein, automated control of the vehicle 100 is defined along a spectrum according to the SAE J3016 standard. The SAE J3016 standard defines six levels of automation from level zero to five. In general, as described herein, semi-autonomous mode refers to levels zero to two, while autonomous mode refers to levels three to five. Thus, the autonomous mode generally involves control and/or maneuvering of the vehicle 100 along a travel route via a computing system to control the vehicle 100 with minimal or no input from a human driver. By contrast, the semi-autonomous mode, which may also be referred to as advanced driving assistance system (ADAS), provides a portion of the control and/or maneuvering of the vehicle via a computing system along a travel route with a vehicle operator (i.e., driver) providing at least a portion of the control and/or maneuvering of the vehicle 100.

With continued reference to the various components illustrated in FIG. 1, the vehicle 100 includes one or more processors 104. In one or more arrangements, the processor(s) 104 can be a primary/centralized processor of the vehicle 100 or may be representative of many distributed processing units. For instance, the processor(s) 104 can be an electronic control unit (ECU). Alternatively, or additionally, the processors include a central processing unit (CPU), a graphics processing unit (GPU), an ASIC, an microcontroller, a system on a chip (SoC), and/or other electronic processing units that support operation of the vehicle 100.

The vehicle 100 can include one or more data stores 102 for storing one or more types of data. The data store 102 can be comprised of volatile and/or non-volatile memory. Examples of memory that may form the data store 102 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, solid-state drivers (SSDs), and/or other non-transitory electronic storage medium. In one configuration, the data store 102 is a component of the processor(s) 104. In general, the data store 102 is operatively connected to the processor(s) 104 for use thereby. The term "operatively connected," as used throughout this description, can include direct or indirect connections, including connections without direct physical contact.

In one or more arrangements, the one or more data stores 102 include various data elements to support functions of the vehicle 100, such as semi-autonomous and/or autonomous functions. Thus, the data store 102 may store map data 106 and/or sensor data 108. The map data 106 includes, in at least one approach, maps of one or more geographic areas. In some instances, the map data 106 can include information about roads (e.g., lane and/or road maps), traffic control devices, road markings, structures, features, and/or landmarks in the one or more geographic areas. The map data 106 may be characterized, in at least one approach, as a high-definition (HD) map that provides information for autonomous and/or semi-autonomous functions.

In one or more arrangements, the map data 106 can include one or more terrain maps 110. The terrain map(s) 110 can include information about the ground, terrain, roads, surfaces, and/or other features of one or more geographic areas. The terrain map(s) 110 can include elevation data in the one or more geographic areas. In one or more arrangements, the map data 106 includes one or more static obstacle maps 112. The static obstacle map(s) 112 can include information about one or more static obstacles located within one or more geographic areas. A "static obstacle" is a physical object whose position and general attributes do not substantially change over a period of time. Examples of static obstacles include trees, buildings, curbs, fences, and so on.

The sensor data 108 is data provided from one or more sensors of the sensor system 114. Thus, the sensor data 108 may include observations of a surrounding environment of the vehicle 100 and/or information about the vehicle 100 itself. In some instances, one or more data stores 102 located onboard the vehicle 100 store at least a portion of the map data 106 and/or the sensor data 108. Alternatively, or in addition, at least a portion of the map data 106 and/or the sensor data 108 can be located in one or more data stores 102 that are located remotely from the vehicle 100.

As noted above, the vehicle 100 can include the sensor system 114. The sensor system 114 can include one or more sensors. As described herein, "sensor" means an electronic and/or mechanical device that generates an output (e.g., an electric signal) responsive to a physical phenomenon, such as electromagnetic radiation (EMR), sound, etc. The sensor system 114 and/or the one or more sensors can be operatively connected to the processor(s) 104, the data store(s) 102, and/or another element of the vehicle 100.

Various examples of different types of sensors will be described herein. However, it will be understood that the embodiments are not limited to the particular sensors described. In various configurations, the sensor system 114 includes one or more vehicle sensors 116 and/or one or more environment sensors. The vehicle sensor(s) 116 function to sense information about the vehicle 100 itself. In one or more arrangements, the vehicle sensor(s) 116 include one or more accelerometers, one or more gyroscopes, an inertial measurement unit (IMU), a dead-reckoning system, a global navigation satellite system (GNSS), a global positioning system (GPS), and/or other sensors for monitoring aspects about the vehicle 100.

As noted, the sensor system 114 can include one or more environment sensors 118 that sense a surrounding environment (e.g., external) of the vehicle 100 and/or, in at least one arrangement, an environment of a passenger cabin of the vehicle 100. For example, the one or more environment sensors 118 sense objects the surrounding environment of the vehicle 100. Such obstacles may be stationary objects and/or dynamic objects. Various examples of sensors of the sensor system 114 will be described herein. The example sensors may be part of the one or more environment sensors 118 and/or the one or more vehicle sensors 116. However, it will be understood that the embodiments are not limited to the particular sensors described. As an example, in one or more arrangements, the sensor system 114 includes one or more radar sensors 120, one or more LiDAR sensors 122, one or more sonar sensors 124 (e.g., ultrasonic sensors), and/or one or more cameras 126 (e.g., monocular, stereoscopic, RGB, infrared, etc.).

Continuing with the discussion of elements from FIG. 1, the vehicle 100 can include an input system 128. The input system 128 generally encompasses one or more devices that enable the acquisition of information by a machine from an outside source, such as an operator. The input system 128 can receive an input from a vehicle passenger (e.g., a driver/operator and/or a passenger). Additionally, in at least one configuration, the vehicle 100 includes an output system 130. The output system 130 includes, for example, one or more devices that enable information/data to be provided to external targets (e.g., a person, a vehicle passenger, another vehicle, another electronic device, etc.).

Furthermore, the vehicle 100 includes, in various arrangements, one or more vehicle systems 132. Various examples of the one or more vehicle systems 132 are shown in FIG. 1. However, the vehicle 100 can include a different arrangement of vehicle systems. It should be appreciated that although particular vehicle systems are separately defined, each or any of the systems or portions thereof may be otherwise combined or segregated via hardware and/or software within the vehicle 100. As illustrated, the vehicle 100 includes a propulsion system 134, a braking system 136, a steering system 138, a throttle system 140, a transmission system 142, a signaling system 144, and a navigation system 146.

The navigation system 146 can include one or more devices, applications, and/or combinations thereof to determine the geographic location of the vehicle 100 and/or to determine a travel route for the vehicle 100. The navigation system 146 can include one or more mapping applications to determine a travel route for the vehicle 100 according to, for example, the map data 106. The navigation system 146 may include or at least provide connection to a global positioning system, a local positioning system or a geolocation system.

In one or more configurations, the vehicle systems 132 function cooperatively with other components of the vehicle 100. For example, the processor(s) 104, the wheel control system 154, and/or automated driving module(s) 152 can be operatively connected to communicate with the various vehicle systems 132 and/or individual components thereof. For example, the processor(s) 104 and/or the automated driving module(s) 152 can be in communication to send and/or receive information from the various vehicle systems 132 to control the navigation and/or maneuvering of the vehicle 100. The processor(s) 104, the wheel control system 154, and/or the automated driving module(s) 152 may control some or all of these vehicle systems 132.

For example, when operating in the autonomous mode, the processor(s) 104, the wheel control system 154, and/or the automated driving module(s) 152 control the heading and speed of the vehicle 100. The processor(s) 104, the wheel control system 154, and/or the automated driving module(s) 152 cause the vehicle 100 to accelerate (e.g., by increasing the supply of energy/fuel provided to a motor), decelerate (e.g., by applying brakes), and/or change direction (e.g., by steering the front two wheels). As used herein, "cause" or "causing" means to make, force, compel, direct, command, instruct, and/or enable an event or action to occur either in a direct or indirect manner.

As shown, the vehicle 100 includes one or more actuators 148 in at least one configuration. The actuators 148 are, for example, elements operable to move and/or control a mechanism, such as one or more of the vehicle systems 132 or components thereof responsive to electronic signals or other inputs from the processor(s) 104 and/or the automated driving module(s) 152. The one or more actuators 148 may include motors, pneumatic actuators, hydraulic pistons, relays, solenoids, piezoelectric actuators, and/or another form of actuator that generates the desired control.

As described previously, the vehicle 100 can include one or more modules, at least some of which are described herein. In at least one arrangement, the modules are implemented as non-transitory computer-readable instructions that, when executed by the processor 104, implement one or more of the various functions described herein. In various arrangements, one or more of the modules are a component of the processor(s) 104, or one or more of the modules are executed on and/or distributed among other processing systems to which the processor(s) 104 is operatively connected. Alternatively, or in addition, the one or more modules are implemented, at least partially, within hardware. For example, the one or more modules may be comprised of a combination of logic gates (e.g., metal-oxide-semiconductor field-effect transistors (MOSFETs)) arranged to achieve the described functions, an ASIC, programmable logic array (PLA), field-programmable gate array (FPGA), and/or another electronic hardware-based implementation to implement the described functions. Further, in one or more arrangements, one or more of the modules can be distributed among a plurality of the modules described herein. In one or more arrangements, two or more of the modules described herein can be combined into a single module.

Furthermore, the vehicle 100 may include one or more automated driving modules 152. The automated driving module(s) 152, in at least one approach, receive data from the sensor system 114 and/or other systems associated with the vehicle 100. In one or more arrangements, the automated driving module(s) 152 use such data to perceive a surrounding environment of the vehicle. The automated driving module(s) 152 determine a position of the vehicle 100 in the surrounding environment and map aspects of the surrounding environment. For example, the automated driving module(s) 152 determines the location of obstacles or other environmental features including traffic signs, trees, shrubs, neighboring vehicles, pedestrians, etc.

The automated driving module(s) 152 either independently or in combination with the wheel control system 154 can be configured to determine travel path(s), current autonomous driving maneuvers for the vehicle 100, future autonomous driving maneuvers and/or modifications to current autonomous driving maneuvers based on data acquired by the sensor system 114 and/or another source. In general, the automated driving module(s) 152 functions to, for example, implement different levels of automation, including advanced driving assistance (ADAS) functions, semi-autonomous functions, and fully autonomous functions, as previously described.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. The systems, components and/or processes also can be embedded in a computer-readable storage, such as a computer program product or other data program storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. A non-exhaustive list of the computer-readable storage medium can include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or a combination of the foregoing. In the context of this document, a computer-readable storage medium is, for example, a tangible medium that stores a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
    a processor; and
    a memory storing machine-readable instructions that, when executed by the processor, cause the processor to:
        detect a slope in a road in front of a vehicle;
        detect a motion sickness state of a passenger of the vehicle; and
        adjust, based on the motion sickness state of the passenger, a pitch angle of the vehicle to offset a slope angle of the road by independently adjusting a rotational speed of different wheels of the vehicle to generate a difference between a front wheel rotational speed of the vehicle and a rear wheel rotational speed of the vehicle.

2. The system of claim 1, wherein the machine-readable instruction that, when executed by the processor, causes the processor to detect the slope in the road comprises a machine-readable instruction that, when executed by the processor, causes the processor to detect the slope in the road based on at least one of:
    vehicle sensor data;
    environment sensor data;
    map data; or
    crowd-sourced sensor data.

3. The system of claim 1, wherein the machine-readable instruction that, when executed by the processor, causes the processor to detect the motion sickness state of the passenger comprises a machine-readable instruction that, when executed by the processor, causes the processor to detect the motion sickness state of the passenger based on at least one of:
    real-time passenger sensor data;
    real-time vehicle sensor data; or
    historical passenger profile data.

4. The system of claim 1, wherein the machine-readable instruction that, when executed by the processor, causes the processor to adjust the pitch angle of the vehicle comprises a machine-readable instruction that, when executed by the processor, causes the processor to adjust the pitch angle of the vehicle based on at least one of:
    a value of the slope angle; or
    a vehicle characteristic.

5. The system of claim 1, wherein the machine-readable instruction that, when executed by the processor, causes the processor to adjust the rotational speed of different wheels of the vehicle to generate the difference between the front wheel rotational speed of the vehicle and the rear wheel rotational speed of the vehicle comprises machine-readable instructions that, when executed by the processor, cause the processor to:
    adjust a rotational speed of front wheels of the vehicle;
    adjust a rotational speed of rear wheels of the vehicle; or
    adjust the rotational speed of the front wheels of the vehicle and the rotational speed of the rear wheels of the vehicle, wherein:
        the rotational speeds of the front wheels are the same; and
        the rotational speed of the rear wheels are the same.

6. The system of claim 1, wherein the machine-readable instruction that, when executed by the processor, causes the processor to adjust the rotational speed of different wheels of the vehicle comprises machine-readable instructions that, when executed by the processor, cause the processor to adjust the rotational speed of different wheels based on a degree of motion sickness of the passenger.

7. The system of claim 1, wherein the machine-readable instruction that, when executed by the processor, causes the processor to adjust the rotational speed of different wheels of the vehicle to generate the difference between the front wheel rotational speed of the vehicle and the rear wheel rotational speed of the vehicle comprises machine-readable instructions that, when executed by the processor, cause the processor to:
    adjust the rotational speed of the different wheels so the rotational speed of front wheels is greater than the rotational speed of rear wheels when the slope angle is positive; and
    adjust the rotational speed of the different wheels so the rotational speed of the front wheels is less than the rotational speed of the rear wheels when the slope angle is negative.

8. The system of claim 1, wherein the machine-readable instructions further comprise a machine-readable instruction that, when executed by the processor, causes the processor to align the front wheel rotational speed and the rear wheel rotational speed responsive to the slope angle of the road being less than a threshold amount.

9. The system of claim 1, wherein the machine-readable instructions further comprise a machine-readable instruction that, when executed by the processor, causes the processor to maintain the difference between the front wheel rotational speed and the rear wheel rotational speed responsive to a driver-based acceleration input.

10. The system of claim 1, wherein the machine-readable instruction that, when executed by the processor, causes the processor to adjust the rotational speed of different wheels of the vehicle to generate the difference between the front wheel rotational speed of the vehicle and the rear wheel rotational speed of the vehicle comprises machine-readable instructions that, when executed by the processor, cause the processor to:
    determine a target pitch adjustment for the vehicle based on the slope angle;
    determine a target difference between the front wheel rotational speed and the rear wheel rotational speed based on the target pitch adjustment; and
    set the rotational speed of the front wheels and the rotational speed of the rear wheels based on the target difference.

11. A non-transitory machine-readable medium comprising instructions that, when executed by a processor, cause the processor to:
    detect a slope in a road in front of a vehicle;
    detect a motion sickness state of a passenger of the vehicle; and
    adjust, based on the motion sickness state of the passenger, a pitch angle of the vehicle to offset a slope angle of the road by independently adjusting a rotational speed of different wheels of the vehicle to generate a difference between a front wheel rotational speed of the vehicle and a rear wheel rotational speed of the vehicle.

12. The non-transitory machine-readable medium of claim 11, wherein the instruction that, when executed by the processor, causes the processor to detect the slope in the road comprises an instruction that, when executed by the processor, causes the processor to detect the slope in the road based on at least one of:
    vehicle sensor data;
    environment sensor data;
    map data; or
    crowd-sourced sensor data.

13. The non-transitory machine-readable medium of claim 11, wherein the instruction that, when executed by the processor, causes the processor to adjust the pitch angle of the vehicle comprises an instruction that, when executed by the processor, causes the processor to adjust the pitch angle of the vehicle based on at least one of:
    a value of the slope angle; or
    a vehicle characteristic.

14. The non-transitory machine-readable medium of claim 11, wherein the instruction that, when executed by the processor, causes the processor to adjust the rotational speed of different wheels of the vehicle to generate the difference between the front wheel rotational speed of the vehicle and the rear wheel rotational speed of the vehicle comprises instructions that, when executed by the processor, cause the processor to:
    adjust the rotational speed of the different wheels so the rotational speed of front wheels is greater than the rotational speed of rear wheels when the slope angle is positive; and
    adjust the rotational speed of the different wheels so the rotational speed of the front wheels is less than the rotational speed of the rear wheels when the slope angle is negative.

15. The non-transitory machine-readable medium of claim 11, wherein the instruction that, when executed by the processor, causes the processor to adjust the rotational speed of different wheels of the vehicle to generate the difference between the front wheel rotational speed of the vehicle and the rear wheel rotational speed of the vehicle comprises instructions that, when executed by the processor, cause the processor to:
    determine a target pitch adjustment for the vehicle based on the slope angle;
    determine a target difference between the front wheel rotational speed and the rear wheel rotational speed based on the target pitch adjustment; and
    set the rotational speed of the front wheels and the rotational speed of the rear wheels based on the target difference.

16. A method, comprising:
    detecting a slope in a road in front of a vehicle;
    detecting a motion sickness state of a passenger of the vehicle; and
    adjusting, based on the motion sickness state of the passenger, a pitch angle of the vehicle to offset a slope angle of the road by independently adjusting a rotational speed of different wheels of the vehicle to generate a difference between a front wheel rotational speed of the vehicle and a rear wheel rotational speed of the vehicle.

17. The method of claim 16, wherein detecting the motion sickness state of the passenger comprises detecting the motion sickness state of the passenger based on at least one of:
    real-time passenger sensor data;
    real-time vehicle sensor data; or
    historical passenger profile data.

18. The method of claim 16, wherein adjusting the pitch angle of the vehicle comprises adjusting the pitch angle of the vehicle based on at least one of:
    a value of the slope angle; or
    a vehicle characteristic.

19. The method of claim 16, wherein adjusting the rotational speed of different wheels of the vehicle to generate the difference between the front wheel rotational speed of the vehicle and the rear wheel rotational speed of the vehicle comprises:
    adjusting the rotational speed of the different wheels so the rotational speed of front wheels is greater than the rotational speed of rear wheels when the slope angle is positive; and
    adjusting the rotational speed of the different wheels so the rotational speed of the front wheels is less than the rotational speed of the rear wheels when the slope angle is negative.

20. The method of claim 16, wherein adjusting the rotational speed of different wheels of the vehicle to generate the difference between the front wheel rotational speed of the vehicle and the rear wheel rotational speed of the vehicle comprises:
    determining a target pitch adjustment for the vehicle based on the slope angle;
    determining a target difference between the front wheel rotational speed and the rear wheel rotational speed based on the target pitch adjustment; and setting the rotational speed of the front wheels and the rotational speed of the rear wheels based on the target difference.

\* \* \* \* \*